United States Patent
Maurer et al.

(10) Patent No.: US 11,511,228 B2
(45) Date of Patent: Nov. 29, 2022

(54) EXHAUST TREATMENT SYSTEM FOR A LEAN BURN ENGINE

(71) Applicant: BASF Corporation, Florham Park, NJ (US)

(72) Inventors: Stefan Maurer, Shanghai (CN); Jia Di Zhang, Shanghai (CN); Yu Dai, Shanghai (CN); Yu Fen Hao, Shanghai (CN); Ming Ming Wei, Shanghai (CN); Teng Shen, Shanghai (CN)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/309,151

(22) PCT Filed: Oct. 24, 2019

(86) PCT No.: PCT/EP2019/079081
§ 371 (c)(1),
(2) Date: Apr. 30, 2021

(87) PCT Pub. No.: WO2020/089043
PCT Pub. Date: May 7, 2020

(65) Prior Publication Data
US 2021/0387145 A1 Dec. 16, 2021

(51) Int. Cl.
*B01D 53/94* (2006.01)
*B01J 23/40* (2006.01)
(Continued)

(52) U.S. Cl.
CPC ....... *B01D 53/9477* (2013.01); *B01D 53/944* (2013.01); *B01D 53/9418* (2013.01);
(Continued)

(58) Field of Classification Search
CPC .... B01D 2255/1023; B01D 2255/9205; B01D 53/9436; B01D 2255/20723;
(Continued)

(56) References Cited

U.S. PATENT DOCUMENTS

| 5,958,370 A | 9/1999 | Zones et al. |
| 2014/0112853 A1* | 4/2014 | Mohanan ................. B01J 29/85 502/66 |

(Continued)

FOREIGN PATENT DOCUMENTS

| DE | 10 2014 117 671 | * 6/2015 | ............... B01J 29/76 |
| JP | 2015 196 115 A | * 11/2015 | ............. Y02T 10/12 |

(Continued)

OTHER PUBLICATIONS

Moliner, et al., "Cu-SSZ-39, an active and hydrothermally stable catalyst for the selective catalytic reduction of NOx", Chemical Communications, vol. 48, Issue 66, Jun. 27, 2012, pp. 8264-8266.
(Continued)

*Primary Examiner* — Timothy C Vanoy
(74) *Attorney, Agent, or Firm* — Finnegan, Henderson, Farabow, Garrett & Dunner, LLP

(57) ABSTRACT

The present invention relates generally to the field of exhaust treatment systems for purifying exhaust gas discharged from a lean burn engine. The exhaust treatment system comprises a Diesel Oxidation Catalyst (DOC), a Catalyzed Soot Filter (CSF), a reductant injector, an AEI zeolite based Selective Catalyzed Reduction (SCR) catalyst and an Ammonia Oxidation Catalyst (AMOX) downstream to the AEI zeolite based SCR catalyst.

29 Claims, 7 Drawing Sheets

(51) Int. Cl.
*B01J 29/76* (2006.01)
*B01J 35/00* (2006.01)
*B01J 35/04* (2006.01)
*B01J 35/10* (2006.01)
*B01J 37/02* (2006.01)
*F01N 3/10* (2006.01)
*F01N 3/20* (2006.01)
*F01N 3/28* (2006.01)

(52) U.S. Cl.
CPC .......... *B01D 53/9436* (2013.01); *B01J 23/40* (2013.01); *B01J 29/76* (2013.01); *B01J 35/0006* (2013.01); *B01J 35/04* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 35/1061* (2013.01); *B01J 37/0246* (2013.01); *F01N 3/103* (2013.01); *F01N 3/106* (2013.01); *F01N 3/2066* (2013.01); *F01N 3/2803* (2013.01); *F01N 3/2842* (2013.01); *B01D 2255/1021* (2013.01); *B01D 2255/1023* (2013.01); *B01D 2255/20738* (2013.01); *B01D 2255/20761* (2013.01); *B01D 2255/50* (2013.01); *B01D 2255/9155* (2013.01); *B01D 2255/9202* (2013.01); *B01D 2255/9205* (2013.01); *B01D 2255/9207* (2013.01); *F01N 2370/04* (2013.01)

(58) Field of Classification Search
CPC ...... B01D 2255/20738; B01D 2255/50; B01D 2255/20761; B01D 53/9477; B01D 2255/1021; B01D 53/944; B01D 53/9418; B01D 2255/9155; B01D 2255/9207; B01D 2255/9202; B01J 29/76; B01J 35/0006; B01J 29/70; B01J 35/023; B01J 35/1014; B01J 37/0246; B01J 36/1061; B01J 29/85; B01J 35/04; B01J 35/1019; B01J 21/066; B01J 29/076; B01J 35/1047; B01J 35/1038; B01J 23/72; B01J 37/0248; B01J 23/40; B01J 35/1042; B01J 37/04; Y02A 50/20; F01N 2370/04; F01N 3/106; F01N 3/2803; F01N 3/2842; Y02T 10/12
See application file for complete search history.

(56) References Cited

U.S. PATENT DOCUMENTS

| | | | |
|---|---|---|---|
| 2016/0354724 A1* | 12/2016 | Marin | B01J 29/76 |
| 2017/0144105 A1* | 5/2017 | Chandler | B01J 35/023 |
| 2017/0259250 A1* | 9/2017 | Tanaka | C01B 39/026 |
| 2018/0043305 A1* | 2/2018 | Voss | B01D 53/9477 |
| 2018/0093256 A1* | 4/2018 | Chen | B01D 53/9418 |

FOREIGN PATENT DOCUMENTS

| | | | | |
|---|---|---|---|---|
| WO | WO-2008/106519 A1 | 9/2008 | | |
| WO | WO-2008/132452 A2 | 11/2008 | | |
| WO | WO-2013/159825 A1 | 10/2013 | | |
| WO | WO-2014/141200 A1 | 9/2014 | | |
| WO | WO-2016/070090 A1 | 5/2016 | | |
| WO | 2017195107 A2 | 11/2017 | | |
| WO | WO 2018 185 655 A1 * | 10/2018 | | F01N 13/009 |

OTHER PUBLICATIONS

International Search Report dated Dec. 17, 2019 for International Application No. PCT/EP2019/079081.

* cited by examiner

EXHAUST TREATMENT SYSTEM FOR A LEAN BURN ENGINE

This application is a national stage filing under 35 U.S.C. § 371 of International Application No. PCT/EP2019/079081, filed on Oct. 24, 2019, which claims priority to International Application No. PCT/CN2018/113696, filed on Nov. 2, 2018; the contents of each application is incorporated herein by reference in its entirety.

TECHNICAL FIELD OF THE INVENTION

The present invention relates generally to the field of exhaust treatment systems for purifying exhaust gas discharged from a lean burn engine.

BACKGROUND OF THE INVENTION

Environmental regulations for emissions of internal combustion engines are becoming increasingly stringent throughout the world. Operation of a lean-burn engine, for example a diesel engine, provides the user with excellent fuel economy due to its operation at high air/fuel ratios under fuel-lean conditions. However, diesel engines also emit exhaust gas emissions containing particulate matter (PM), unburned hydrocarbons (HC), carbon monoxide (CO), and nitrogen oxides (NOx), wherein NOx describes various chemical species of nitrogen oxides, including nitrogen monoxide and nitrogen dioxide, among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising a precious metal, such as one or more platinum group metals (PGMs), dispersed on a refractory metal oxide support, such as alumina, are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from diesel engines to treat the exhaust before it vents to the atmosphere. Typically, the diesel oxidation catalysts are formed on ceramic or metallic substrates upon which one or more catalyst coating compositions are deposited. In addition to the conversion of gaseous HC and CO emissions and particulate matter (SOF portion), oxidation catalysts that contain one or more PGMs promote the oxidation of NO to $NO_2$. Catalysts are typically defined by their light-off temperature or the temperature at which 50% conversion is attained, also called T50.

NOx (a combination of NO and $NO_2$) is contained in exhaust gases, such as from internal combustion engines (e.g., in automobiles and trucks), from combustion installations (e.g., power stations heated by natural gas, oil, or coal), and from nitric acid production plants. Various treatment methods have been used for the treatment of NOx containing gas mixtures to decrease atmospheric pollution.

One effective method to reduce NOx from the exhaust of lean-burn engines, such as gasoline direct injection and partial lean-burn engines, as well as from diesel engines requires reaction of NOx under lean burn engine operating conditions with a suitable reductant such as ammonia, urea, hydrogen or hydrocarbons in the presence of a selective catalytic reduction (SCR) catalyst component. The SCR process uses catalytic reduction of nitrogen oxides with a reductant (e.g., ammonia) in the presence of atmospheric oxygen, resulting in the formation predominantly of nitrogen and steam:

$$4NO + 4NH_3 + O_2 \rightarrow 4N_2 + 6H_2O \text{ (standard SCR reaction)} \quad (1),$$

$$2NO_2 + 4NH_3 + O_2 \rightarrow 3N_2 + 6H_2O \text{ (slow SCR reaction)} \quad (2); \text{ and}$$

$$NO + NO_2 + 2NH_3 \rightarrow 2N_2 + 3H_2O \text{ (fast SCR reaction)} \quad (3),$$

Molecular sieves such as zeolites have been used in the selective catalytic reduction (SCR) of nitrogen oxides with a reductant such as ammonia, urea, or a hydrocarbon in the presence of FIG. 7 oxygen. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures, have recently found interest in use as SCR catalysts. Specific types of zeolite having these properties are chabazite SSZ-13 (CHA) and SSZ-39 (AEI), which are a small pore zeolite with 8 member-ring pore openings (~3.8 Angstroms) accessible through their 3-dimensional porosity.

Metal-promoted zeolite catalysts including, among others, iron-promoted and copper promoted zeolite catalysts, for the selective catalytic reduction of nitrogen oxides with ammonia are known. The practice of employing Cu promoted CHA as SCR catalyst has been described in PCT Application WO 2008/106519.

U.S. Pat. No. 5,958,370 firstly discloses the potential application of Cu-AEI in SCR catalysts.

PCT Application WO 2008/132452 discloses a SCR catalyst comprising at least one small pore molecular sieve, wherein said molecular sieve comprises amongst others also AEI carrying metal promoters.

Moliner et al. Chemical Communications (2012), 48(66), 8264-8266 describes the synthesis of Cu-AEI and its use as an active and hydrothermally stable catalyst for the selective catalytic reduction of NOx.

Based on the same set of experimental data, PCT Application WO 2013/159825 claims the utilization of such AEI SCR in combination with a catalyzed soot filter, however no experiment for this particular combination is given.

PCT Application WO 2014/141200 describes metal-promoted zeolites having an AEI structure and a silica to alumina molar ratio (SAR) of about 20 to about 30 being more hydrothermally stable compared to other zeolite catalysts with similar SARs and similar metal loadings.

To further improve NOx conversion in diesel exhaust treatment systems, accordingly, a catalyst is needed with improved NO conversion efficiency relative to the current technologies while providing minimized $N_2O$ release, in particular for low temperature conditions.

SUMMARY OF THE INVENTION

The present invention relates to an exhaust treatment system for a lean burn engine, the exhaust treatment system comprising a Diesel Oxidation Catalyst (DOC), a Catalyzed Soot Filter (CSF), a first reductant injector, an AEI zeolite based Selective Catalyzed Reduction (SCR) catalyst and a first Ammonia Oxidation Catalyst (AMOX) downstream to the AEI zeolite based SCR catalyst.

A first aspect of the present invention relates to an exhaust treatment system for a lean burn engine, the exhaust treatment system comprising a Diesel Oxidation Catalyst (DOC), a Catalyzed Soot Filter (CSF), a first reductant injector, an AEI zeolite based Selective Catalyzed Reduction (SCR) catalyst and a first Ammonia Oxidation Catalyst (AMOX) downstream to the AEI zeolite based SCR catalyst; wherein the AEI zeolite has a silica to alumina molar ratio of 10-19, preferably 14-18.

A second aspect of the present invention relates to a method for the treatment of exhaust gas from a lean burn engine comprising: (i) providing an exhaust treatment system according to the first aspect, and (ii) conducting the exhaust gas from the lean burn engine through the exhaust treatment system.

DESCRIPTION OF EMBODIMENTS

Figure 1:
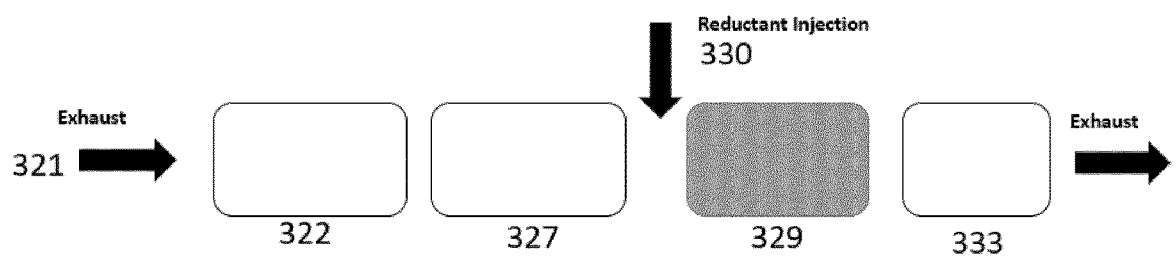
FIG. 1 is a schematic view showing exhaust treatment systems according to one or more embodiments.

Before describing several exemplary embodiments of the invention, it is to be understood that the invention is not limited to the details of construction or process steps set forth in the following description. The invention is capable of other embodiments and of being practiced or being carried out in various ways.

A major problem encountered in the treatment of automotive exhaust gas streams is the so-called "cold start" period, which is the time period at the beginning of the treatment process, when the exhaust gas stream and the exhaust gas treatment system are at low temperatures. Also, during certain periods during normal driving low temperatures can be encountered, e.g. prolonged low-speed city driving. In addition, continuous improvement in fuel combustion efficiency with recent engine developments is leading to a general decrease in engine out temperatures.

At lower temperature regions around 200° C. and lower, there is a continuous need for exhaust gas treatment systems to further increase activity, in particular to more effectively convert nitrogen oxides (NOx) into nitrogen at temperatures such as those found during cold-start or prolonged low-speed city driving. As a result, considerable efforts have been made to alleviate this problem.

In addition, the formation of nitrous oxide $N_2O$ as unwanted byproduct formed during SCR reaction although released at relatively small amounts has to be further minimized, due to its high "global warming potential" (310 times that of carbon dioxide).

It has surprisingly been found that such AEI based SCR catalyst with a silica to alumina molar ratio of 10-19, preferably 14-18 is more effective in converting NOx under various engine operating conditions in such an exhaust treatment system compared to AEI catalysts with higher silica to alumina molar ratios (SARs) in the same exhaust system as well as leading to minimized $N_2O$ release while maintaining similar levels of hydrothermal stability. More surprisingly such catalyst system also showed enhanced NOx conversion not only at very low temperatures, but also at high temperatures.

Thus, according to embodiments of the invention, provided is an exhaust treatment system for a lean burn engine, the exhaust treatment system comprising a Diesel Oxidation Catalyst (DOC), a Catalyzed Soot Filter (CSF), a first reductant injector, an AEI zeolite based Selective Catalyzed Reduction (SCR) catalyst and a first Ammonia Oxidation Catalyst (AMOX) downstream to the AEI zeolite based SCR catalyst; wherein the AEI zeolite has a silica to alumina molar ratio of 10-19, preferably 14-18.

With respect to the terms used in this disclosure, the following definitions are provided.

Throughout the description, including the claims, the term "comprising one" or "comprising a" should be understood as being synonymous with the term "comprising at least one", unless otherwise specified, and "between" should be understood as being inclusive of the limits.

The terms "a", "an" and "the" are used to refer to one or to more than one (i.e., to at least one) of the grammatical object of the article.

The term "and/or" includes the meanings "and", "or" and also all the other possible combinations of the elements connected to this term.

All percentages and ratios are mentioned by weight unless otherwise indicated.

As used herein, the term 'SAR' refers to $SiO_2:Al_2O_3$ molar ratio or silica to alumina oxide molar ratio. The zeolite powder was shaped into tablets and the silica to alumina oxide molar ratio (SAR) determined by XRF with a PANalytical Axios-mAX.

As used herein, the terms "catalyst" or "catalyst material" or "catalytic material" refer to a material or mixture of materials that promotes a reaction.

Selective Catalytic Reduction (SCR) Composition

One effective method to reduce NOx from the exhaust of lean-burn engines, such as gasoline direct injection and partial lean-burn engines, as well as from diesel engines requires reaction of NOx under lean burn engine operating conditions with a suitable reductant such as ammonia or hydrocarbon in the presence of a selective catalytic reduction (SCR) catalyst component. In this process, NOx is reduced with a suitable reductant, such as ammonia (NH3), to nitrogen (N2) over an SCR catalyst. The technology represents one of the best approaches for achieving aggressive NOx reduction goals. The source of ammonia can be urea (typically present in an aqueous solution), among others. SCR provides efficient conversions of NOx as long as the exhaust temperature is within the active temperature range of the catalyst, the operating window.

Suitable SCR catalyst compositions for use in the system can effectively catalyze the reduction of NOx even under conditions of low load which typically are associated with lower exhaust temperatures, such as ≤300° C.

Suitable SCR catalyst compositions for use in the system also have thermal resistance to temperatures≥550° C. Such high temperatures may be encountered under conditions of high load, or during the regeneration of soot filters.

For the abovementioned reasons, suitable SCR catalyst compositions preferably have a wide enough operating temperature range so that they can accommodate the variable temperature ranges over which the vehicle operates.

In one or more embodiments, conversion of NOx passing through the SCR catalyst is in the range of about 10% to about 100% of the system NOx conversion, preferably in the range of about 30% to about 100%, more preferably in the range of about 50% to about 100%, under engine operating conditions.

In one or more embodiments, an SCR catalyst can optionally be integrated with other functions such as CO oxidation, hydrocarbon storage, hydrocarbon oxidation, NOx storage, NO oxidation, ammonia storage, ammonia oxidation, etc. as one catalyst or in one "brick". For example, an SCR catalyst may possess the ability of an AMOx function: conversion of the NOx component of the exhaust stream to $N_2$ and to catalyze the reaction of $O_2$ with any excess $NH_3$ to $N_2$ and $H_2O$, so that $NH_3$ is not emitted to the atmosphere. For example, an SCR catalyst can optionally be coated with a soot filter. The catalyzed soot filter comprising an SCR catalyst is effective in two functions: removal of the particulate component of the exhaust stream and conversion of the NOx component of the exhaust stream to $N_2$.

In one or more embodiments, the SCR comprises at least a zeolite or non-zeolitic molecular sieve component and/or at least a promoter metal component.

In specific embodiments, the SCR comprises a zeolite with framework type selected from, but not limited to, CHA, AEI, BEA, MFI, FAU, MOR, AFX and LTA or a mixture of two or more thereof and a mixed type of two or more thereof, preferably selected from the group consisting of CHA, BEA and AEI, more preferably AEI.

The promoter metal may be any of the recognized catalytically active metals that are used in the catalyst industry to form metal-exchanged zeolites, particularly those metals that are known to be catalytically active for treating exhaust gases derived from a combustion process. Particularly preferred are metals useful in NOx reduction and storage processes. Promoter metal should be broadly interpreted and specifically includes copper, iron, vanadium, tungsten, antimony, nickel, zinc, molybdenum, cobalt, titanium, zirconium, manganese, chromium, niobium, tin, bismuth, etc; platinum group metals, such as platinum, palladium, rhodium, ruthenium, indium, and precious metals such as gold and silver, etc. Transition metals are preferred as promoter metals. Base metals are more preferred as promoter metals.

In one or more embodiments, the base metal component is selected from one or both of copper and iron.

In one or more specific embodiments, the promoter metal component, for example selected from copper and iron, has a content exceeding about 0.2 wt %, calculated as oxides of the metal and based on the total weight of the oxides plus the zeolite or non-zeolitic molecular sieve based catalyst composition. In preferred specific embodiments, the base metal component has a content from about 2 wt % to about 10 wt %, preferably from about 2 wt % to about 8 wt %, more preferably from about 2.5 wt % to about 6 wt %.

In one or more specific embodiments, the promoter metal component is copper. The SCR catalyst has a copper to alumina (alumina from zeolite or non-zeolitic molecular sieve) molar ratio from about 0.01 to 0.5, or preferably from 0.2 to 0.5.

In one or more embodiments, the SCR comprises Cu and a zeolite with framework type preferably selected from, but not limited to, CHA, AEI, BEA, MFI, FAU, MOR, AFX and LTA or a mixture of two or more thereof and a mixed type of two or more thereof, more preferably selected from the group consisting of CHA and AEI, wherein the zeolitic material comprising copper contained in the SCR catalyst has a framework of type AEI.

Molecular sieves are classified by the Structure Commission of the International Zeolite Association according to the rules of the IUPAC Commission on Zeolite Nomenclature. According to this classification, framework-type zeolites and other crystalline microporous molecular sieves, for which a structure has been established, are assigned a three-letter code and are described in the Atlas of Zeolite Framework Types, 5th edition, Elsevier, London, England (2001).

Among said zeolitic materials, SSZ-39 is a well-studied example, wherein it is the representative of the class of zeolitic materials having a AEI framework structure. Besides aluminosilicates such as SSZ-39, the class of zeolitic materials having a AEI framework structure comprises compounds further comprising phosphorous in the framework structure which are accordingly referred to as silicoaluminophosphates (SAPO), in the particular case of the AEI framework denoted as SAPO-18. Zeolitic materials of the AEI framework type are characterized by three-dimensional 8-membered-ring (8MR) pore/channel systems containing double-six-rings (D6R) and cages.

In one or more embodiments, there is a restriction as to the $SiO_2:Al_2O_3$ molar ratio (SAR) displayed for the inventive zeolitic catalyst having a AEI-type framework structure. Accordingly, by way of example, the zeolitic material having a AEI-type framework structure may have an $SiO_2:Al_2O_3$ molar ratio comprised in the range of anywhere from 5 to 20, wherein preferably, the $SiO_2:Al_2O_3$ molar ratio is comprised in the range of from 8 to 20, more preferably from 9 to 19.5, and even more preferably from 10 to 19. According to particularly preferred embodiments, the inventive zeolitic catalyst having a AEI-type framework structure has a $SiO_2:Al_2O_3$ molar ratio comprised in the range of from 14 to 18.

In one or more embodiments, the AEI zeolite in the SCR catalyst by way of example has a crystal size in the range of anywhere from 0.1 to 2.5 microns, preferably, the crystal size is in the range of from 0.3 to 2.0, more preferably from 0.5 to 1.8, and even more preferably from 0.8 to 1.5. According to particularly preferred embodiments, the inventive zeolitic catalyst having a AEI-type framework structure has crystal size comprised in the range of from 1.0 to 1.5 microns.

The crystal size was obtained by collecting images of the primary crystals of the zeolite powder on a Hitachi SU-1510 electron microscope after pretreating the powder sample by spraying with gold.

In one or more embodiments, the AEI zeolite in the SCR catalyst by way of example has an agglomerate size with a mean $d_{10}$ in the range of anywhere from 0.5 to 2.5 microns. wherein preferably, the agglomerate size with a mean $d_{10}$ is comprised in the range of from 0.7 to 2.0, more preferably from 0.8 to 1.6, and even more preferably from 1.0 to 1.5. According to particularly preferred embodiments, the inventive zeolitic catalyst having a AEI-type framework structure has an agglomerate size with a mean d10 comprised in the range of from 1.2 to 1.4 microns.

PSD measurement was conducted on Sympatec Helosquixel with a R2 lens. The powder sample was suspended in DI water to form a slurry with a solid content of 33.3% and subdued to the PSD measurement without prior ultrasonication.

In one or more embodiments, the AEI zeolite in the SCR catalyst by way of example has an agglomerate size with a mean $d_{90}$ in the range of anywhere from 5 to 30 microns. wherein preferably, the agglomerate size with a mean $d_{90}$ is comprised in the range of from 5.5 to 28, more preferably from 6 to 20, and even more preferably from 7 to 15. According to particularly preferred embodiments, the inventive zeolitic catalyst having a AEI-type framework structure has an agglomerate size with a mean $d_{90}$ comprised in the range of from 7.2 to 14 microns.

In one or more embodiments, the AEI zeolite in the SCR catalyst by way of example has an zeolitic surface area (ZSA) of at least 450 $m^2/g$, wherein preferably, the zeolitic surface area is larger than 470 $m^2/g$, more preferably larger than 500 $m^2/g$, and even more preferably larger than 525 $m^2/g$. According to particularly preferred embodiments, the inventive zeolitic catalyst having a AEI-type framework structure has an zeolitic surface area of from 550 to 700 $m^2/g$.

In one or more embodiments, the AEI zeolite in the SCR catalyst by way of example has a matrix surface area (MSA) of being smaller than 50 $m^2/g$, wherein preferably, the matrix surface area is smaller than 40 $m^2/g$, more preferably smaller than 30 $m^2/g$, and even more preferably smaller than 25 $m^2/g$. According to particularly preferred embodiments, the inventive zeolitic catalyst having a AEI-type framework structure with the matrix surface area of being smaller than 20 $m^2/g$ and larger than 0 $m^2/g$.

As used herein, the term "zeolitic surface area" refers to the deBoer t-plot method for determining the micropore surface area by $N_2$ adsorption and desorption.

As used herein, the term "matrix surface area" refers to the deBoer t-plot method for determining the external surface area by $N_2$ adsorption and desorption.

As used herein, the term "total surface area" refers to the Brunauer, Emmett, Teller (BET) method for determining surface area by $N_2$ adsorption. Pore diameter and total pore volume can be also be determined via $N_2$ adsorption or desorption.

ZSA and MSA measurement for the zeolite powder samples were performed on a Micromeritics ASAP 2420 using the t-plot measurement protocol with nitrogen as probe gas. Before the measurement, the sample is degassed at is 350° C. for 2 h.

BET measurement for the zeolite powder samples were performed on a Micromeritics ASAP 2420 using the BET measurement protocol with nitrogen as probe gas. Before the measurement, the sample is degassed at is 350° C. for 2 h.

In one or more embodiments, the AEI zeolite in the SCR catalyst by way of example has a tapped density after 100 strikes in the range of anywhere from 0.10 to 0.90 g/ml, wherein preferably, the tapped density after 100 strikes is comprised in the range of from 0.15 to 0.75, more preferably from 0.2 to 0.6, and even more preferably from 0.25 to 0.5. According to particularly preferred embodiments, the inventive zeolitic catalyst having a AEI-type framework structure has a tapped density after 100 strikes comprised in the range of from 0.3 to 0.4 g/ml.

The tap density is measured on ERWEKA SVM 222. About 80 ml sample was filled in a graduated cylinder and tapped for 100 times within 1 minute with the tap height being 3 mm.

In one or more embodiments, the AEI zeolite in the SCR catalyst has a water uptake of at least 250 $cm^3/g$ at a relative water pressure $P/P_0$ of 0.5 at 295 K after degassing for 5 h at 300° C., wherein preferably, the water uptake is larger than 255 $cm^3/g$, more preferably larger than 260 $cm^3/g$ and even more preferably larger than 265 $cm^3/g$. According to particularly preferred embodiments, the inventive zeolitic catalyst having a AEI-type framework structure has water uptake of from 270 to 850 $cm^3/g$ at a relative water pressure $P/P_0$ of 0.5 at 295 K after degassing for 5 h at 300° C.

Water isotherms were measured on a BEL Japan BEL-SORP-aqua[3] for a powdered zeolite sample. Prior to the water adsorption measurements, water (analyte) was flash frozen under liquid nitrogen and then evacuated under dynamic vacuum at least 5 times to remove any gases in the water reservoir. The measurement temperature was controlled with a water circulator and set to 298 K. Helium was used for the estimation of dead space for gas and water adsorption measurements. The zeolite powder sample was degassed at 300° C. for 5 h.

Depending on the specific needs of its application, the AEI zeolite according to particular and preferred embodiments of the present application can be employed as such, like in the form of a powder, a spray powder or a spray granulate for making a slurry.

As regards the slurry making and coating procedure to prepare the AEI catalyst for the inventive exhaust gas treatment system, there is no particular restriction either regarding the specific impregnation method which is applied to introduce Cu or Fe, nor with respect to whether said step is repeated and, if yes, the number of times said step is repeated. Thus, by way of example, slurry making may be conducted with the aid of a solvent or solvent mixture in which the ion to be exchanged is suitably dissolved or suspended. With respect to the type of solvent which may be used, there is again no particular restriction in this respect, provided that the ions to be exchanged, i.e. copper and/or iron and preferably copper or iron, may be solvated or suspended therein.

In one or more embodiments, the zeolitic material having a AEI-type framework structure contains iron or cupper as a non-framework element, as well as with respect to particularly preferred embodiments wherein the zeolitic material only comprises copper as non-framework element, there is no particular restriction as to the Cu:Al molar ratio of the zeolitic material, provided that the total loading of iron and copper as non-framework elements calculated as $Fe_2O_3$ and CuO is comprised in the range of from 0.1 to 25 wt. %, preferably 2.0-8.0 wt. %, more preferably 2.5 to 6.0% wt. %. Thus, by way of example, the Cu:Al molar ratio of the zeolitic material may range anywhere from 0.01 to 1, wherein preferably the Cu:Al molar ratio is comprised in the range of from 0.1 to 0.5, more preferably of from 0.2 to 0.5 and even more preferably of from 0.25 to 0.45. According to particularly preferred embodiments of the present invention, the Cu:Al molar ratio of the zeolitic material ranges from 0.3 to 0.4.

In one or more embodiments, the second zeolitic material having a AEI-type, CHA-type or BEAtype framework structure contains iron or copper as a non-framework element, as well as with respect to particularly preferred embodiments wherein the zeolitic material only comprises copper as non-framework element, there is again no particular restriction as to the Fe:Al molar ratio of the zeolitic material, provided that the total loading of copper and iron as non-framework elements respectively calculated as $Fe_2O_3$ and CuO is comprised in the range of from 0.1 to 25 wt. %, preferably 2.0-8.0 wt. %, more preferably 2.5 to 6.0% wt. %. Thus, by way of example, the Fe:Al molar ratio of the zeolitic material may range anywhere from 0.01 to 1, wherein preferably the Fe:Al molar ratio is comprised in the range of from 0.05 to 0.7, more preferably of from 0.1 to 0.5, more preferably of from 0.15 to 0.4, more preferably of from 0.18 to 0.35, and even more preferably of from 0.2 to 0.3. According to particularly preferred embodiments of the present invention, the Fe:Al molar ratio of the zeolitic material ranges from 0.22 to 0.28.

In some preferred embodiments, the zeolitic material is ion-exchanged during slurry making process either with iron or with copper. According to said preferred embodiments of the present invention wherein the zeolitic material is ion-exchanged during slurry making process with copper alone, there is no particular restriction as to the amount of copper in the ion-exchange material obtained during slurry making process provided that the total amount thereof is comprised in the range of from 0.1 to 25 wt. % calculated as CuO. According to particularly preferred embodiments, however, the total amount of copper is comprised in the range of from 0.5 to 10 wt. %, more preferably of from 2 to 8 wt. %, and even more preferably of from 2.5 to 6. According to particularly preferred embodiments thereof, the total amount of copper which is ion-exchanged during slurry making process is comprised in the range of from 4 to 5 wt. % calculated as CuO.

The surprising technical effects of the present invention are particularly pronounced at a balanced loading of copper and/or iron in the zeolitic material obtained during slurry making process and applied in the inventive exhaust treatment system. Consequently, embodiments of the present invention are particularly preferred, wherein the total amount of copper and/or iron in the ion-exchanged material is comprised in the range of from 3 to 10 wt. % calculated as $Fe_2O_3$ and CuO, respectively. Even more preferably, the total amount of copper and/or iron is comprised in the range of from 3.5 to 8 wt. %, and even more preferably of from 4 to 6 wt. %. According to yet further preferred embodiments thereof, the total amount of copper and/or iron in the ion-exchange material obtained in step (3) ranges from 4 to 5 wt. % calculated as $Fe_2O_3$ and CuO, respectively.

Thus, by way of example, any suitable iron(II) and/or iron(III) compound, preferably any iron(II) compound, may be employed such as one or more iron(II) and/or iron(III) salts, and more preferably one or more iron(II) salts, selected from the group consisting of iron halides, preferably iron chloride and/or iron bromide, more preferably iron chloride, iron perchlorate, iron sulfite, iron sulfate, iron hydrogensulfate, iron nitrite, iron nitrate, iron dihydrogenphosphate, iron hydrogenphosphate, iron carbonate, iron hydrogencarbonate, iron acetate, iron citrate, iron malonate, iron oxalate, iron tartrate, and mixtures of two or more thereof. Preferably, the one or more iron compounds used for ion-exchange during slurry making step is preferably selected from the group consisting of iron chloride and/or iron bromide, preferably iron chloride, iron perchlorate, iron sulfate, iron nitrate, iron acetate, and mixtures of two or more thereof, wherein preferably the one or more iron compound is an iron(II) or iron (III) compound. According to particularly preferred embodiments of the present invention, iron used for ion-exchange during slurry making step comprises iron nitrate, preferably iron(III) nitrate, wherein even more preferably iron(III) nitrate is used as the iron compound during slurry making step.

As regards the copper compound which may be used for ion-exchange during slurry making step, again, again any suitable copper(I) and/or copper(II) compound may be used, wherein preferably a copper(II) compound is used which is preferably a copper(II) salt. Thus, by way of example, one or more copper(II) salts may be used which are selected from the group consisting of copper(II) halides, preferably copper(II) chloride and/or copper(II) bromide, more preferably copper(II) chloride, copper(II) perchlorate, copper(II) sulfite, copper(II) hydrogensulfate, copper(II) sulfate, copper(II) nitrite, copper(II) nitrate, copper(II) dihydrogenphosphate, copper(II) hydrogenphosphate, copper(II) phosphate, copper(II) hydrogencarbonate, copper(II) carbonate, copper (II) acetate, copper(II) citrate, copper(II) malonate, copper (II) oxalate, copper(II) tartrate, copper (II) oxide and mixtures of two or more thereof, wherein more preferably the copper(II) salt is selected from the group consisting of copper(II) chloride and/or copper(II) bromide, preferably copper(II) chloride, copper(II) sulfate, copper(II) nitrate, copper(II) acetate, copper (II)oxide, and mixtures of two or more thereof. According to particularly preferred embodiments of the present invention, copper used for ion-exchange during slurry making step comprises copper(II) oxide, wherein more preferably the copper compound used for ion-exchange during slurry making step is copper(II) oxide.

Thus, in one or more embodiments, the zeolitic material subdued to the slurry making process may be optionally ion-exchanged with $H^+$ and/or $NH_4^+$, preferably with $H^+$, and/or preferably and optionally calcined prior to ion-exchange with copper and/or iron during slurry making step. According to preferred embodiments of the present invention, the zeolitic material obtained is first ion-exchanged with $H^+$ prior to ion-exchange with copper and/or iron during slurry making step. In this respect, any conceivable ion-exchange procedure such as for example the treatment of the zeolitic material with an acid such as with an acidic medium and in particular with an acidic solution may be employed for achieving the exchange of ionic non-framework elements contained in the zeolitic material against $H^+$. According to the present invention it is however particularly preferred that said ion-exchange of non-framework elements against $H^+$ is achieved by first ion-exchanging one or more of the ionic non-framework elements contained in the zeolitic material against ammonium such as by means of contacting the zeolitic material with ammonium-containing solution, after which the zeolitic material which has been ion-exchanged with ammonium is calcined. According to said particularly preferred embodiments, the ammonium exchange procedure followed by the calcination procedure is repeated one or more times, and preferably repeated twice, thus affording the H-form of the zeolitic material used for the slurry making process.

In some preferred embodiments, the powder or sprayed AEI zeolite material in its H-form is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

In some preferred embodiments, the powder or the sprayed material, optionally after admixing or coating by a suitable refractory binder as described above, is formed into a slurry, for example with water to form an aqueous mixture, which is deposited upon a suitable refractory carrier. The slurry may also comprise other compounds such as, e.g., stabilizers, defoamers, promotors, dispersants, surfactants, rheology modifiers, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

In one or more embodiments, the coating process with the aqueous mixture wherein the aqueous mixture consists of water from 10 to 90 weight %, preferably from 25 to 80 weight %, more preferably from 40 to 70 weight %.

In one or more embodiments, the aqueous mixture prepared comprises the non-zeolitic oxidic material at an amount in the range of from 2 to 50 weight %, preferably in the range of from 3 to 35 weight %, more preferably in the range of from 4 to 20 weight %, based on the weight of the zeolitic material comprised in the aqueous mixture.

In one or more embodiments, the aqueous mixture further comprises a precursor of an oxidic binder, wherein the precursor is preferably one or more of an aluminum salt, a silicon salt, a zirconium salt, and a titanium salt, more preferably one or more of a zirconium salt, and an aluminum salt, more preferably a zirconium salt, more preferably zirconium acetate;
wherein more preferably, in the aqueous mixture prepared, the amount of precursor calculated as oxide, preferably as alumina, silica, zirconia or titania, more preferably of the zirconium salt calculated as $ZrO_2$, is in the range of from 1 to 10 weight %, more preferably in the range of from 2 to 8 weight %, more preferably in the range 3 to 7 weight %, based on the weight of the zeolitic material comprised in the aqueous mixture.

In one or more embodiments, the aqueous mixture prepared further comprises an additive, preferably at an amount in the range of from 0.5 to 15 weight %, more preferably in the range of from 1 to 7.5 weight %, based on the weight of the zeolitic material comprised in the aqueous mixture prepared.

In one or more embodiments, the aqueous mixture prepared further comprises a sugar, preferably one or more of sucrose, glucose and fructose, more preferably sucrose, wherein the aqueous mixture prepared preferably comprises the sugar at an amount in the range of from 1 to 15 weight %, preferably in the range of from 2 to 10 weight %, more preferably in the range of from 2.5 to 6 weight %, based on the weight of the zeolitic material comprised in the aqueous mixture prepared.

In one or more embodiments, the aqueous mixture prepared, wherein the slurry preparation process further comprises milling the aqueous mixture, preferably until the particles of the aqueous mixture have a $D_{90}$ in the range of from 0.5 to 50 micrometers, more preferably in the range of from 2 to 30 micrometers, more preferably in the range of from 2 to 20 micrometers.

In one or more embodiments, the SCR catalyst composition prepared according to the preparation process has a particle size distribution (PSD) $D_{50}$ from about 1 microns to about 10 microns. In one or more embodiments, the SCR catalyst composition has particle size distribution $D_{90}$ from about 2 microns to about 30 microns.

In some preferred embodiments, the zeolitic material according to any of the particular and preferred embodiments as described in the present application is used as a catalyst and/or catalyst support, preferably as a catalyst in a selective catalytic reduction (SCR) process for the selective reduction of nitrogen oxides NOx.

Accordingly, the present invention relates to a method for selectively reducing nitrogen oxides NOx by contacting a gas stream containing NOx with a catalyst containing the zeolitic material having a AEI-type framework structure according to any of the particular and preferred embodiments as described in the present application, in particular under suitable reducing conditions. Within the meaning of the present invention, the terms "nitrogen oxides" and "NOx" designate nitrogen monoxide (NO), nitrogen dioxide ($NO_2$), and/or mixtures thereof, and preferably designate a mixture of NO and $NO_2$.

To set up the inventive exhaust system the AEI zeolite may be disposed on a substrate. In one or more embodiments, the substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

In one or more embodiments, the substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

In one or more embodiments, the ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention having a AEI-type framework structure may be deposited on an open cell foam substrate. Such substrates are well known in the art, and are typically formed of refractory ceramic or metallic materials.

In some preferred embodiments, the zeolitic material is coated after slurry making process on a suitable substrate as outlined in the earlier embodiments. According to said preferred embodiments on which the zeolitic material is coated after slurry making process, there is no particular restriction as to the amount of slurry coated on such substrate provided that the total dry gain thereof is comprised in the range of from 10 to 350 g/l calculated as total dry gain after calcination against the volume of the blank substrate. According to particularly preferred embodiments, however, the total dry gain is comprised in the range of from 20 to 300 g/l, more preferably of from 50 to 250 g/l, and even more preferably of from 80 to 200 g/l. According to particularly preferred embodiments thereof, the total dry gain on the substrate is comprised in the range of from 100 to 200 g/l calculated as total dry gain after calcination against the weight of the blank substrate.

In some more preferred embodiments, the aqueous mixture is disposed according over x % of the substrate axial length from the inlet end to the outlet end of the substrate or from the outlet end to the inlet end of the substrate, wherein x is in the range of from 80 to 100, preferably in the range of from 90 to 100, more preferably in the range of from 95 to 100, more preferably in the range of from 98 to 100.

In one or more embodiments, the coating process with the aqueous slurry, wherein the substrate is a wall-flow filter substrate, preferably one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate.

In one or more embodiments, the coating process with the aqueous slurry, wherein the substrate is a flow-through substrate, preferably one or more of a cordierite flow-through substrate, a silicon carbide flow-through substrate and an aluminum titanate flow-through substrate, more preferably one or more of a silicon carbide flow-through substrate and an aluminum titanate flow-through substrate, more preferably a silicon carbide flow-through substrate.

In one or more embodiments, the coating process with the aqueous slurry, wherein drying of the coated substrate is performed in a gas atmosphere having a temperature in the range of from 60 to 300° C., preferably in the range of from 90 to 200° C., the gas atmosphere preferably comprising oxygen.

In one or more embodiments, the coating process with the aqueous slurry, wherein drying is performed in a gas atmosphere for a duration in the range from 10 seconds to 15 minutes, preferably in the range of from 20 seconds to 10 minutes, more preferably from 30 seconds to 5 minutes, the gas atmosphere preferably comprising oxygen.

The coating process with the aqueous slurry, wherein disposing comprises
- (ii.1) disposing a first portion of the aqueous mixture on the surface of the internal walls of a substrate comprising an inlet end, an outlet end, a substrate axial length extending from the inlet end to the outlet end and a plurality of passages defined by internal walls of the substrate extending therethrough; and drying the substrate comprising the first portion of the mixture disposed thereon;
- (ii.2) disposing a second portion of the aqueous mixture on the substrate comprising the first portion of the mixture disposed thereon obtained in (ii.1), and optionally drying the substrate comprising the first and the second portion of the mixture disposed thereon.

In one or more embodiments, the coating process with the aqueous slurry, wherein prior to disposing a first portion of the aqueous mixture on the surface of the internal walls of a substrate according to (i.1), the aqueous mixture obtained is further diluted.

In one or more embodiments, the coating process with the aqueous slurry, wherein the coated and dried aqueous mixture is further calcined in a gas atmosphere having a temperature in the range of from 300 to 900° C., preferably in the range of from 400 to 650° C., more preferably in the range of from 400 to 500° C. or more preferably in the range of from 550 to 600° C., the gas atmosphere preferably comprising oxygen.

In one or more embodiments, the coating process with the aqueous slurry, wherein calcining is performed in a gas atmosphere for a duration in the range of from 0.1 to 4 hours, preferably in the range of from 0.2 to 2.0 hours, the gas atmosphere preferably comprising oxygen.

In one or more embodiments, a SCR catalyst comprising a zeolitic material comprising copper, said catalyst being obtained or obtainable by the coating process with the aqueous slurry followed by drying and calcination.

In one or more embodiments, the SCR catalyst, wherein from 75 to 100 weight %, preferably from 78 to 100 weight %, more preferably from 80 to 100 weight-%, of the copper or iron comprised in the catalyst is comprised in the zeolitic material.

In one or more embodiments, the SCR catalyst, wherein the catalyst comprises the zeolitic material at a loading in the range of from 0.5 to 6 $g/in^3$, preferably in the range of from 1.2 to 5.5 $g/in^3$, more preferably in the range of from 1.7 to 4.5 $g/in^3$.

In one or more embodiments, the SCR catalyst, wherein the catalyst comprises the non-zeolitic oxidic material at a loading in the range of from 0.02 to 1.8 $g/in^3$, preferably in the range of from 0.1 to 1.35 g/in³, more preferably in the range of from 0.1 to 0.9 g/in³.

In one or more embodiments, the SCR catalyst, wherein the catalyst further comprises an oxidic binder, wherein the oxidic binder is selected from the group consisting of alumina, silica, zirconia, titanic, a mixed oxide of two of more of Si, Al, Zr and Ti, and a mixture of two or more thereof, preferably selected from the group consisting of alumina, zirconia, a mixed oxide of Al and Zr, and a mixture of thereof, wherein the oxidic binder is more preferably zirconia; wherein the catalyst more preferably comprises the oxidic binder at a loading in the range of from 0.01 to 0.9 g/in³, more preferably in the range of from 0.04 to 0.6 g/in³, more preferably in the range of from 0.06 to 0.3 g/in³.

In one or more embodiments, the SCR catalyst comprises at least one inorganic metal oxide material selected from vanadium oxide, molybdenum oxide, niobium oxide. In certain embodiments, the SCR comprises a mixed oxide of vanadium oxide and titanium oxide. In certain embodiments, the SCR comprises a mixed oxide of vanadium oxide, silicon oxide and titanium oxide. In certain other embodiments, the SCR comprises a mixed oxide of vanadium oxide, tungsten oxide and titanium oxide. In certain other embodiments, the SCR comprises a mixed oxide of vanadium oxide, antimony oxide and titanium oxide.

In certain embodiments, the SCR catalyst composition has at least a rare earth metal component. In a specific embodiment, the SCR catalyst composition has cerium.

In certain embodiments, the SCR catalyst composition has at least an alkali metal component and/or alkaline earth metal component.

In one or more embodiments, the optional second SCR catalyst comprises a zeolitic material comprising copper or iron and has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MW, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, BEA a mixture of two or more thereof of two or more thereof, more preferably selected from the group consisting of CHA, AEI, RTH, AFX, BEA a mixture of two or more thereof and a mixed type of two or more thereof, more preferably selected from the group consisting of CHA and AEI and BEA, wherein the zeolitic material comprising copper or iron has a framework type CHA.

In one or more embodiments, the second SCR catalyst comprises a zeolitic material, preferably which has a framework type CHA, has a mean crystallite size of at least 0.1 micrometer, preferably in the range of from 0.1 to 3.0 micrometers, more preferably in the range of from 0.3 to 1.9 micrometer, more preferably in the range of from 0.4 to 1.5 micrometer determined via scanning electron microscopy.

In one or more embodiments, the second SCR catalyst comprises a zeolitic material, which has a framework type CHA, has a silica to alumina molar ratio of at least 5, preferably in the range of from 5 to 40, more preferably in the range of from 8 to 35, more preferably in the range of from 10 to 25.

In one or more embodiments, the second SCR catalyst comprises a zeolitic material, which has a framework type BEA, has a silica to alumina molar ratio of at least 5, preferably in the range of from 5 to 50, more preferably in the range of from 8 to 40, more preferably in the range of from 10 to 30.

In one or more embodiments, the second SCR catalyst comprises a zeolitic material, which has a framework type AEI, has a silica to alumina molar ratio of at least 10, preferably in the range of from 10 to 30, more preferably in the range of from 12 to 25, more preferably in the range of from 14 to 19.

In one or more embodiments, the second SCR catalyst comprises a zeolitic material, wherein the amount of copper comprised in the zeolitic material, calculated as CuO, is in the range of from 0.1 to 10 weight-%, preferably in the range of from 1 to 8 weight-%, more preferably in the range of from 2 to 6 weight-% based on the weight of the zeolitic material.

In one or more embodiments, the second SCR comprises Fe and a zeolite with framework type preferably selected from, but not limited to, CHA, AEI, BEA, MFI, FAU, MOR, AFX and LTA. In one specific embodiment, the SCR comprises Fe and a zeolite having a BEA structure. In the other one specific embodiment, the SCR comprises Fe and a zeolite having a CHA structure.

In one or more embodiments, the second SCR catalyst comprises a zeolitic material, wherein the amount of iron comprised in the zeolitic material, calculated as $Fe_2O_3$, is in the range of from 0.1 to 10 weight %, preferably in the range of from 1 to 8 weight %, more preferably in the range of from 2 to 6 weight % based on the weight of the zeolitic material.

In one or more embodiments, the second SCR catalyst comprises at least one inorganic metal oxide material selected from vanadium oxide, molybdenum oxide, niobium oxide. In certain embodiments, the SCR comprises a mixed oxide of vanadium oxide and titanium oxide. In certain embodiments, the SCR comprises a mixed oxide of vanadium oxide, silicon oxide and titanium oxide. In certain other embodiments, the SCR comprises a mixed oxide of vanadium oxide, tungsten oxide and titanium oxide. In certain other embodiments, the SCR comprises a mixed oxide of vanadium oxide, antimony oxide and titanium oxide.

In one or more embodiments, the second SCR catalyst composition has at least a rare earth metal component. In a specific embodiment, the SCR catalyst composition has cerium.

In one or more embodiments, the second SCR catalyst composition has at least an alkali metal component and/or alkaline earth metal component.

In one or more embodiments, the second SCR catalyst composition has refractory metal oxides such as alumina, silica, zirconia, titania, ceria, praseodymia, magnesia, barium oxide, manganese oxide, tin oxide, tungsten oxide, rear earth metal oxide, base metal oxide and the like, as well as physical mixtures or chemical combinations thereof, which provide advantageous properties such as binding, thermal stability, sulfur resistance, etc.

A process for preparing the second SCR catalyst, the process comprising
(i) preparing an aqueous mixture comprising water, a zeolitic material having a framework type CHA and a source of copper or iron;
(ii) optionally drying the mixture obtained in (i);
(iii) calcining the mixture obtained in (i), or in (ii).

In one or more embodiments, the second SCR catalyst composition prepared according to the preparation process has a particle size distribution (PSD) $D_{50}$ from about 1 microns to about 10 microns. In one or more embodiments, the SCR catalyst composition has particle size distribution $D_{90}$ from about 2 microns to about 30 microns.

In one or more embodiments, the SCR catalyst composition prepared according to the preparation process has a total surface area (BET) in the range of about 50 to about 700 m$^2$/g. In one or more embodiments, the SCR catalyst composition prepared according to the preparation process has a total pore volume (BET) in the range of about 0.3 to about 1.5 cm$^3$/g. In one or more embodiments, the SCR catalyst composition has mean pore diameter (BET) in the range of about 2 to about 50 nm.

In one or more embodiments, the SCR is coated according to the preparation process with at least a catalyst washcoat loading (dry gain) from about 0.5 to about 6 g/in$^3$, preferably from about 1.5 to about 5.5 g/in$^3$, and more preferably from about 2.0 to about 4.5 g/in$^3$.

Diesel Oxidation Catalyst (DOC) Composition

As used herein, the term "DOC" refers to a diesel oxidation catalyst, which controls emissions of HC and CO from diesel vehicles. The DOC catalyst mainly contains PGM, alumina, zeolite and titania on ceramic substrate, preferably contain Pt, titania as well as silica as additives on ceramic substrate.

Generally, a DOC composition comprises one or more platinum group metal (PGM) components dispersed on a support, such as a refractory metal support. Various such DOC compositions are known for use in treating the exhaust of diesel engines in order to convert both hydrocarbon (HC) and carbon monoxide (CO) gaseous pollutants by catalyzing the oxidation of these pollutants to carbon dioxide and water. In addition to the conversion of gaseous HC and CO emissions and particulate matter (SOF portion), various such DOC compositions catalyze the oxidation of NO to NO$_2$ to facilitate downstream SCR reaction (via fast SCR reaction) for NOx removal from the exhaust. Optionally, various such DOC compositions are integrated with compositions to show at least one function of hydrocarbon storage, NOx storage, and fuel light-off.

As used herein, the term "PGM" refers to platinum group metal, such as platinum, palladium, ruthenium, rhodium, osmium, iridium, and/or gold (Pt, Pd, Ru, Rh, Os, Ir, and/or Au). It is to be understood that the PGM may be in metallic form, with zero valence, or the PGM may be in an oxide form. The PGM components can include the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide. In some embodiments, the PGM component is a metal or an oxide thereof (e.g., including, but not limited to, platinum or an oxide thereof).

In one or more embodiments, the DOC composition disclosed herein comprises total PGM loading from about 5 g/ft$^3$ to about 250 g/ft$^3$, and preferably from about 10 g/ft$^3$ to about 140 g/ft$^3$, calculated as the total weight of PGM element over the volume of the DOC catalyst.

In one or more embodiments, the DOC composition disclosed herein comprises total PGM loading from about 0.1 wt. % to about 20 wt. %, preferably from about 0.5 wt. % to about 10 wt. %, based on the weight of the dry DOC composition.

In one or more embodiments, the DOC composition disclosed herein comprises a platinum (Pt) component without palladium (Pd).

In one or more embodiments, the DOC composition disclosed herein comprises a palladium (Pd) component without platinum (Pt).

In one or more embodiments, the DOC composition disclosed herein comprises both a platinum component and a palladium component. In some embodiments, the Pt/Pd weight ratio is from about 10:1 to about 1:10, preferably from about 1:2 to about 2:1.

In one or more embodiments, the DOC composition may comprise, for example, a platinum component in the range of from about 0.1 wt. % to about 20 wt. %, preferably from about 0.5 wt. % to about 10 wt. %, based on the weight of the dry DOC composition.

In one or more embodiments, the DOC composition may comprise, for example, a platinum component from about 1 to about 167 g/ft$^3$, based on the volume of the DOC catalyst.

In one or more embodiments, the DOC composition may comprise, for example, a palladium component from about 0.1 wt. % to about 20 wt. %, preferably from about 0.5 wt. % to about 10 wt. %, based on the weight of the dry DOC composition.

In one or more embodiments, the DOC composition may comprise, for example, a palladium component from about 1 to about 167 g/ft$^3$, based on the volume of the DOC catalyst.

In one or more embodiments, both the platinum and palladium components of the disclosed DOC composition are supported on a support material (wherein the support material on which the platinum component and the palladium component are supported can be the same or different). Support materials can be zeolitic or non-zeolitic. Reference to a "non-zeolite-support" or "non-zeolitic support" in a catalyst layer refers to a material that is not a zeolite and that receives precious metals, stabilizers, promoters, binders and the like through association, dispersion, impregnation or other suitable methods. Examples of such non-zeolite supports include, but are not limited to, high surface area refractory metal oxides. The support material on which the catalytically active platinum component and palladium component are deposited, for example, comprises a refractory metal oxide, which exhibits chemical and physical stability at high temperatures, such as the temperatures associated with gasoline or diesel engine exhaust.

As used herein, the terms "layer" and "layered" refer to a structure that is supported on a surface, e.g. a substrate.

As used herein, the term "support" refers to underlying high surface area material upon which additional chemical compounds or elements are carried.

As used herein, the term "refractory metal oxides" refers to metal oxides that are extraordinarily resistant to heat and wear, such as alumina, silica, zirconia, titania, ceria, praseodymia, magnesia, barium oxide, manganese oxide, tin oxide, tungsten oxide, rear earth metal oxide, base metal oxide and the like, as well as physical mixtures or chemical combinations thereof, including atomically-doped combinations and including high surface area or activated compounds such as activated alumina. Included are combinations of metal oxides such as silica-alumina, ceria-zirconia, praseodymia-ceria, alumina-zirconia, alumina-ceria-zirconia, lanthana-alumina, lanthana-zirconia-alumina, baria-alumina, baria-lanthana-alumina, baria-lanthana-neodymia-alumina, and alumina-ceria, alumina doped with at least one rear earth metal oxide, and alumina doped with at least one base metal oxide.

Exemplary alumina materials include large pore boehmite, gamma-alumina, delta/theta alumina and activated alumina, such as high bulk density gamma-alumina, low or medium bulk density large pore gamma-alumina and low bulk density large pore boehmite and gamma-alumina. High surface area metal oxide supports, such as alumina or titania support materials, typically exhibit a BET surface area, the active alumina has a specific surface area of about 50 $m^2/g$ to about 400 $m^2/g$, preferably from about 60 $m^2/g$ to about 350 $m^2/g$, more preferably from about 90 $m^2/g$ to about 250 $m^2/g$. The active alumina has mean pore volume in the range of about 0.3 to about 1.5 $cm^3/g$. The active alumina has mean pore diameter in the range of about 2 to about 50 nm.

In one or more embodiments, metal oxide supports useful in the DOC catalyst compositions disclosed herein are doped alumina materials, such as Si-doped alumina materials (including, but not limited to 1-10 wt. % of $SiO_2$—$Al_2O_3$), doped titania materials, such as Si-doped titania materials (including, but not limited to 1-15 wt. % of $SiO_2$—$TiO_2$) or doped zirconia materials, such as Si-doped $ZrO_2$ (including, but not limited to 5-30 wt. % of $SiO_2$—$ZrO_2$).

In one or more embodiments, the DOC catalyst composition may comprise any of the above named refractory metal oxides and in any amount. In one or more embodiments, the catalyst composition may comprise from about 50 wt. % to about 99.9 wt. %, including about 60 wt. % to about 99.8 wt. %, including about 70 wt. % to about 99.6 wt. % of refractory metal oxides, based on the total dry weight of the catalyst composition.

In one or more embodiments, the DOC catalyst composition may, for example, comprise from about 10 to about 99 wt. % of alumina, preferably from about 15 to about 95 wt. % of alumina, more preferably from about 20 to about 85 wt. % of alumina.

In one or more embodiments, the DOC catalyst composition may comprise a hydrocarbon storage or hydrocarbon adsorption component. In some embodiments, the bottom layer or the top layer of a DOC catalyst further comprises a hydrocarbon storage or hydrocarbon adsorption component selected from a molecular sieve or a zeolite, or ceria-containing molecular sieve, or ceria-containing metal oxides. The hydrocarbon storage or hydrocarbon adsorption component can be added as $H^+$ form. The hydrocarbon storage or hydrocarbon adsorption component may further comprise one or more catalytically active metals selected from PGM (such as platinum, palladium, rhodium, etc), copper, iron, cerium, zirconium, barium, manganese, magnesium, cobalt, nickel, rear earth metal oxide, base metal oxide, etc.

In one or more embodiments, the DOC catalyst composition has particle size distribution $D_{50}$ from about 1 microns to about 10 microns. In one or more embodiments, the DOC catalyst composition has particle size distribution $D_{90}$ from about 4 microns to about 30 microns.

In one or more embodiments, the DOC catalyst composition has a total surface area (BET) in the range of about 50 to about 400 $m^2/g$. In one or more embodiments, the DOC catalyst composition has total pore volume (BET) in the range of about 0.3 to about 1.5 $cm^3/g$. In one or more embodiments, the DOC catalyst composition has mean pore diameter (BET) in the range of about 2 to about 50 nm. In one or more embodiments, the DOC catalyst composition is coated on a substrate with a washcoat loading (dry gain) from about 0.3 to about 3.0 $g/in^3$.

Catalyzed Soot Filter (CSF) Composition

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters can remove over 90% of the particulate material from diesel exhaust.

Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged. This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The filter is a physical structure for removing particles from exhaust. The accumulating particles will increase the back pressure from the filter on the engine. Thus, the accumulating particles have to be continuously or periodically burned out of the filter to maintain an acceptable back pressure. Unfortunately, the carbon soot particles require temperatures in excess of 500° C. to burn under oxygen rich (lean) exhaust conditions. This temperature is higher than what is typically present in diesel exhaust.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as $O_2$ or $NO_2$ to combust the particulate matter.

Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be actively generated using upstream oxidation catalysts that oxidize NO in the exhaust stream.

In spite of the presence of the catalyst compositions and provisions for using $NO_2$ as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to about 550° C. to about 650° C. Depending on driving mode, high exotherms can occur inside the filter when the cooling during regeneration is not sufficient (low speed/low load or idle driving mode). Such exotherms may exceed 800° C. or more within the filter.

In one or more embodiments, the soot filter is coated with a catalyst to promote soot combustion and thereby promoting filter regeneration. In one or more embodiments, the soot filter is coated with a catalyst to promote NOx conversion. In one or more embodiments, the soot filter is coated with a catalyst to have at least one function of CO oxidation, hydrocarbon storage, hydrocarbon oxidation, NOx storage, NO oxidation, and fuel light-off.

In one or more embodiments, a catalyzed soot filter (CSF) is disposed downstream of the diesel oxidation catalyst.

In one or more embodiments, the catalyzed soot filter has a plurality of longitudinally extending passages bounded by longitudinally extending walls. In specific embodiments, the inlet passages have an open inlet end and a closed outlet end, and the outlet passages have a closed inlet end and an open outlet end. In one or more embodiments, the soot filter comprises a wall flow monolith with a wall porosity of about 40% to about 70%. In one or more embodiments, the soot filter comprises a wall flow monolith with an average pore diameter of about 5 microns to about 30 microns.

In one or more embodiments, the catalyzed soot filter comprises at least a catalyst composition in or on the walls of the soot filter. In one or more embodiments, the catalytic composition can be, for example, coated as a catalytic washcoat in or on the walls of the soot filter.

In one or more embodiments, the soot filter is coated with at least a catalyst that permeates the walls of a wall flow monolith. In other embodiments, the soot filter is coated with at least a catalyst on the walls of a wall flow monolith. In still other embodiments, the soot filter is coated with at least a catalyst both on the walls and permeates the walls of a wall flow monolith.

In one or more embodiments, at least about 50% by volume of at least a catalyst is located within the walls of the soot filter, preferably at least about 70% by volume of at least a catalyst is located within the walls of the soot filter, more preferably, at least about 90% by volume of at least a catalyst is located within the walls of the soot filter.

In one or more embodiments, the soot filter is coated from the inlet passages of the wall flow monolith. In other embodiments, the soot filter is coated from the outlet passages of the wall flow monolith. In still other embodiments, the soot filter is coated with at least a catalyst composition from both the inlet passages and the outlet passages of the wall flow monolith.

In one or more embodiments, the catalyzed soot filter comprises one or more catalytic materials. Catalytic materials may be present in or on the inlet side of the wall alone, in or on the outlet side alone, both the inlet and outlet sides, or the wall itself may consist all, or in part, of the catalytic material.

In one or more embodiments, the catalyzed soot filter includes the use of one or more layers of catalytic materials and combinations of one or more layers of catalytic materials in or on the inlet and/or outlet walls.

In one or more embodiments, the catalyzed soot filter is effective in combusting the particulate matter with nitrogen dioxide, and is effective to optimize the ratio of NO to $NO_2$ exiting the filter.

In one or more embodiments, the CSF composition comprises at least a PGM, such as platinum, palladium, ruthenium, rhodium, osmium, iridium, and/or gold (Pt, Pd, Ru, Rh, Os, Ir, and/or Au). Other catalytic components effective for promoting the combustion of soot include vanadium, tungsten, silver, rhenium, ceria, iron, manganese, nickel, copper (V, W, Ag, Re, Ce, Fe, Mn, Ni, Cu) and combinations thereof. These catalytic components can be used alone or on support materials. In particular embodiments, the CSF composition disclosed herein comprises total PGM loading from about 0.5 g/ft$^3$ to about 250 g/ft$^3$, calculated as the total weight of PGM element over the volume of the CSF catalyst; or the CSF composition disclosed herein comprises total PGM loading from about 0.01 wt. % to about 10 wt. %, based on the weight of the dry CSF composition.

In specific embodiments, the CSF composition disclosed herein comprises a platinum (Pt) component without palladium (Pd). In other specific embodiments, the CSF composition disclosed herein comprises a palladium (Pd) component without platinum (Pt). In still other specific embodiments, the CSF composition disclosed herein comprises both a platinum component and a palladium component.

In one or more embodiments, the CSF composition may comprise, for example, a platinum component from about 0.002 wt. % to about 8 wt. %, based on the weight of the dry CSF composition. The CSF composition may comprise, for example, a platinum component from about 0.1 to about 167 g/ft$^3$, based on the volume of the CSF catalyst. The CSF composition may comprise, for example, a palladium component from about 0.002 wt. % to about 8 wt. %, based on the weight of the dry CSF composition. The CSF composition may comprise, for example, a palladium component from about 0.1 to about 167 g/ft$^3$, based on the volume of the CSF catalyst.

In one or more embodiments, the Pt/Pd weight ratio is from about 10:1 to about 1:10. In some embodiments, the Pt/Pd weight ratio is from about 5:1 to about 2:1.

In one or more embodiments, both the platinum and palladium components of the disclosed CSF composition are supported on a support material (wherein the support material on which the platinum component and the palladium component are supported can be the same or different).

In one or more specific embodiments, metal oxide supports useful in the CSF compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-15% $SiO_2$—$TiO_2$) or doped zirconia materials, such as Si-doped $ZrO_2$ (including, but not limited to 5-30% $SiO_2$—$ZrO_2$), high surface area metal oxide supports, such as alumina or titania support materials, typically exhibit a total surface area (BET) of about 50 m$^2$/g to about 400 m$^2$/g, preferably from about 60 m$^2$/g to about 350 m$^2$/g, more preferably from about 90 m$^2$/g to about 250 m$^2$/g. In one or more specific embodiments, the support material has total pore volume (BET) in the range of about 0.3 to about 1.5 cm3/g. In one or more specific embodiments, the active alumina has mean pore diameter (BET) in the range of about 2 to about 50 nm.

In one or more embodiments, the CSF catalyst composition may comprise a hydrocarbon storage or hydrocarbon adsorption component. For example, the bottom layer or the top layer of a CSF catalyst further comprises a hydrocarbon storage or hydrocarbon adsorption component selected from a molecular sieve or a zeolite, or ceria-containing molecular sieve, or ceria-containing metal oxides. The hydrocarbon storage or hydrocarbon adsorption component can be added as H+ form. The hydrocarbon storage or hydrocarbon adsorption component may further comprise one or more catalytically active metals selected from PGM (such as platinum, palladium, rhodium, etc), copper, iron, cerium, zirconium, barium, manganese, magnesium, cobalt, nickel, rear earth metal oxide, base metal oxide, etc.

In one or more embodiments, the catalyzed soot filter containing a catalyst that promotes SCR reaction is effective in two functions: removal of the particulate component of the exhaust stream and conversion of the NOx component of the exhaust stream to $N_2$. In specific embodiments, the catalyzed soot filter that can achieve NOx reduction is deposited with SCR catalyst composition.

An additional aspect for consideration in catalyzed soot filter is the selection of the appropriate SCR catalyst composition. First, the catalyst composition must be thermally durable so that it maintains its SCR catalytic activity even after prolonged exposure to higher temperatures that are characteristic of filter regeneration. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The catalyzed soot filter should have a high specific activity combined with a high hydrothermally stability.

In one or more embodiments, the catalyzed soot filter comprising a catalyst that promotes SCR reaction is effective in two functions: removal of the particulate component of the exhaust stream and conversion of the NOx component of the exhaust stream to $N_2$. In specific embodiments, the catalyzed soot filter that can achieve NOx reduction is deposited with SCR catalyst composition.

In one or more embodiments, conversion of NOx passing through the CSF is in the range of about 10% to about 100% of the system NOx conversion, preferably in the range of about 30% to about 95%, more preferably in the range of about 50% to about 90%, under engine operating conditions.

In one or more embodiments, the CSF comprises at least a zeolite component and base metal component selected from one or both of a copper and iron.

In some preferred embodiments, the SCR catalyst composition comprises from 95 to 100 weight %, preferably from 98 to 100 weight %, more preferably from 99 to 100 weight % of the framework structure of the zeolitic material consist of Si, Al, 0, and optionally H, wherein in the framework structure, the molar ratio of Si to Al, calculated as molar $SiO_2:Al_2O_3$, is preferably in the range of from 2:1 to 50:1, more preferably in the range of from 2:1 to 45:1, more preferably in the range of from 10:1 to 19:1, more preferably in the range of from 14:1 to 18:1.

In specific embodiments, the CSF comprises Cu and a zeolite with framework type preferably selected from, but not limited to, CHA, AEI, BEA, MFI, FAU, MOR, AFX and LTA. In one specific embodiment, the CSF comprises Cu and a zeolite having a CHA structure. In the other one specific embodiment, the CSF comprises Cu and a zeolite having an AEI structure.

In other specific embodiments, the CSF comprises Fe and a zeolite with framework type preferably selected from, but not limited to, CHA, AEI, BEA, MFI, FAU, MOR, AFX and LTA. In one specific embodiment, the CSF comprises Fe and a zeolite having a BEA structure. In the other one specific embodiment, the CSF comprises Fe and a zeolite having a CHA structure.

Zeolite compositions that may be used in accordance with one or more specific embodiments of the CSF include zeolites having a CHA or AEI structure. Exemplary CHA or AEI zeolites have a silica to alumina molar ratio (SAR) greater than about 8. In a preferred embodiment, silica to alumina molar ratio (SAR) for CHA is from about 10 to about 35. In another preferred embodiment, silica to alumina molar ratio (SAR) for AEI is from about 14 to 19.

In one or more specific embodiments, the base metal component selected from copper and iron has a content exceeding about 0.2 wt %, calculated as oxides of the metal and based on the total weight of the oxides plus the zeolite based catalyst composition. In preferred specific embodiments, the base metal component has a content from about 0.2 wt % to about 8 wt %, preferably from about 2 wt % to about 6 wt %.

Other useful compositions for CSF include non-zeolitic molecular sieves. For example, silicoaluminophosphates such as, but not limited to, SAPO-34, SAPO-44 and SAPO-18 may be used in accordance with one or more embodiments.

In one or more embodiments, the CSF comprises at least one inorganic metal oxide material selected from vanadium oxide and molybdenum oxide. In other embodiments, the CSF comprises a mixed oxide of vanadium oxide and titanium oxide. In certain other embodiments, the CSF comprises a mixed oxide of vanadium oxide, silicon oxide and titanium oxide. In certain other embodiments, the CSF comprises a mixed oxide of vanadium oxide, tungsten oxide and titanium oxide. In certain other embodiments, the CSF comprises a mixed oxide of vanadium oxide, antimony oxide and titanium oxide.

In one or more embodiments, the CSF catalyst composition has particle size distribution $D_{50}$ from about 1 microns to about 10 microns. In one or more embodiments, the CSF catalyst composition has particle size distribution $D_{90}$ from about 2 microns to about 30 microns.

In one or more embodiments, the CSF catalyst composition has a total surface area (BET) in the range of about 50 to about 700 m$^2$/g. In one or more embodiments, the CSF catalyst composition has total pore volume (BET) in the range of about 0.3 to about 1.5 cm3/g. In one or more embodiments, the CSF catalyst composition has mean pore diameter (BET) in the range of about 2 to about 50 nm.

In one or more embodiments, the CSF comprises a porous filter wall having a mean pore diameter; and a catalyst coating having a mean particle size; wherein the ratio of the filter mean pore diameter to the catalyst mean particle size distribution $D_{50}$ is in the range of 0.5 to 50, and/or the ratio of the filter mean pore diameter to the catalyst mean particle size distribution $D_{90}$ is in the range of 0.25 to 30.

In one or more embodiments, the CSF is coated with at least a catalyst with a washcoat loading (dry gain) from about 0.05 to about 3.0 g/in$^3$, preferably from about 0.1 to about 2.5 g/in$^3$.

Ammonia Oxidation Catalyst (AMOX) Composition

Ammonia slip from the ammonia-SCR catalyst presents a number of problems. The odor threshold for $NH_3$ is 20 ppm in air. Eye and throat irritation are noticeable above 100 ppm, skin irritation occurs above 400 ppm, and the IDLH is 500 ppm in air. $NH_3$ is caustic, especially in its aqueous form. Condensation of $NH_3$ and water in cooler regions of the exhaust line downstream of the exhaust catalysts will give a corrosive mixture. Therefore, it is desirable to eliminate the ammonia before it can slip out of the tailpipe.

A selective ammonia oxidation catalyst (AMOx) is employed for this purpose, with the objective to convert the excess ammonia to $N_2$. It is desirable to provide a catalyst for selective ammonia oxidation that is able to convert ammonia at a wide range of temperatures where ammonia slip occurs in the vehicles driving cycle, and can produce minimal nitrogen oxide byproducts. The AMOx catalyst should also produce minimal $N_2O$, which is a potent greenhouse gas. An ammonia oxidation catalyst or AMOx refers to a catalyst that promotes the oxidation of $NH_3$. Preferably, the ammonia oxidation catalyst (AMOx) is used to convert ammonia to $N_2$ as major product, and to produce minimal nitrogen oxide byproducts.

One or more embodiments that include an ammonia oxidation catalyst and a second catalytic composition can be referred to as a "multi-component" AMOx catalyst.

In one or more embodiments, the ammonia oxidation catalyst can optionally be integrated with other functions such as SCR, CO oxidation, hydrocarbon storage, hydrocarbon oxidation, NOx storage, NO oxidation, etc. as one catalyst or in one "brick".

In one or more embodiments, the ammonia oxidation catalyst can optionally be integrated with other functions as one catalyst or in one "brick" via different layouts (zoning, layering, homogeneous, etc.).

As used herein, the term "brick" refers to a single article such as a monolith, such as flow through monolith or a filter, such as wall flow filter.

In one or more embodiments, an AMOx catalyst is optionally integrated with a zoned SCR composition or a layered SCR composition. In specific embodiments, an undercoat layer or a top layer comprising an AMOx catalyst may be present in a downstream zone of a substrate. In specific embodiments, an undercoat layer or a top layer comprising an AMOx catalyst may extend from the outlet end towards the inlet end in the range of about 10% to about 80% of the substrate length of a catalyst.

In one or more embodiments, an AMOx layer may also be present on a second substrate downstream of an SCR catalyst to provide a downstream AMOx catalyst.

In one or more embodiments, an ammonia oxidation catalyst (AMOx) may comprise at least a supported precious metal component, such as one or more platinum group metals (PGMs), which is effective to remove ammonia from an exhaust gas stream. In specific embodiments, the precious metal may include platinum, palladium, rhodium, ruthenium, iridium, silver or gold. In specific embodiments, the precious metal component includes physical mixtures or chemical or atomically-doped combinations of precious metals.

In specific embodiments, the AMOx composition disclosed herein comprises total PGM loading from about 0.5 g/ft³ to about 10 g/ft³, calculated as the total weight of PGM element over the volume of the AMOx catalyst, or the AMOx composition disclosed herein comprises total PGM loading from about 0.01 wt. % to about 2 wt. %, based on the weight of the dry AMOx composition.

In specific embodiments, the precious metal component comprises platinum (Pt). The ammonia oxidation catalyst comprises the platinum (Pt) component in an amount in the range of about 0.5 g/ft³ to about 10 g/ft³, or the ammonia oxidation catalyst comprises the platinum (Pt) component in an amount in the range of about 0.01 wt. % to about 2 wt. %.

In specific embodiments, the precious metal component comprises palladium (Pd). The ammonia oxidation catalyst comprises the palladium (Pd) component in an amount in the range of about 0.5 g/ft³ to about 10 g/ft³, or the ammonia oxidation catalyst comprises the palladium (Pd) component in an amount in the range of about 0.01 wt. % to about 2 wt. %.

In specific embodiments, the precious metal component comprises rhodium (Rh). The ammonia oxidation catalyst comprises the rhodium (Rh) component in an amount in the range of about 0.5 g/ft³ to about 10 g/ft³, or the ammonia oxidation catalyst comprises the rhodium (Rh) component in an amount in the range of about 0.01 wt. % to about 2 wt. %.

The precious metal component is typically deposited on a high surface area refractory metal oxide support. Examples of suitable high surface area Refractory Metal Oxides include alumina, silica, titania, ceria, and zirconia, magnesia, barium oxide, manganese oxide, tungsten oxide, and rear earth metal oxide rear earth metal oxide, base metal oxides, as well as physical mixtures, chemical combinations and/or atomically-doped combinations thereof.

In one or more embodiments, metal oxide supports useful in the AMOx compositions disclosed herein are alumina or doped alumina materials, such as Si-doped alumina materials (including, but not limited to 1-10% $SiO_2$—$Al_2O_3$), titania or doped titania materials, such as Si-doped titania materials (including, but not limited to 1-15% $SiO_2$—$TiO_2$) or zirconia or doped zirconia materials, such as Si-doped $ZrO_2$ (including, but not limited to 5-30% $SiO_2$—$ZrO_2$), high surface area metal oxide supports, such as alumina or titania support materials, typically exhibit a total surface area (BET) of about 50 m²/g to about 400 m²/g, and preferably from about 60 m²/g to about 350 m²/g, for example from about 90 m²/g to about 250 m²/g. The support material has total pore volume (BET) in the range of about 0.3 to about 1.5 cm³/g. The active alumina has mean pore diameter (BET) in the range of about 2 to about 50 nm.

In one or more embodiments, the AMOx catalyst may include at least a zeolitic or non-zeolitic molecular sieve. In specific embodiments, the zeolitic or non-zeolitic molecular sieve has a framework type preferably selected from, but not limited to, CHA, AEI, BEA, MFI, FAU, MOR, AFX and LTA. In specific embodiments, the zeolitic or non-zeolitic molecular sieve may be physically mixed with at least a metal oxide-supported PGM component. In one specific embodiment, the PGM may be distributed on the external surface or in the channels, cavities or cages of the zeolitic or non-zeolitic molecular sieve.

In one or more embodiments, the ammonia oxidation catalyst comprises at least a zeolite component and base metal component selected from one or both of a copper and iron component.

In one or more embodiments, the AMOx catalyst comprise a catalyst coating with a bottom layer of a Pt supported on a high surface area metal oxide; and further comprise a second catalyst coating with a layer of Cu-CHA or Cu-AEI.

In one or more embodiments, the ammonia oxidation catalyst comprises at least one inorganic metal oxide material selected from vanadium oxide and molybdenum oxide.

In one or more embodiments, the ammonia oxidation catalyst has particle size distribution $D_{50}$ from about 1 microns to about 10 microns, and/or the ammonia oxidation catalyst has particle size distribution $D_{90}$ from about 2 microns to about 30 microns.

In one or more embodiments, the ammonia oxidation catalyst has a surface area (BET) in the range of about 50 to about 700 m$^2$/g. In one or more embodiments, the ammonia oxidation catalyst has mean pore volume (BET) in the range of about 0.3 to about 1.5 cm3/g. In one or more embodiments, the ammonia oxidation catalyst has mean pore diameter (BET) in the range of about 2 to about 50 nm. In one or more embodiments, the ammonia oxidation catalyst is coated on a substrate with a dry gain from about 0.3 to about 3.0 g/in$^3$.

Coating Compositions

To produce catalytic articles, a substrate as disclosed herein is coated with a catalytic composition. The coatings are "catalytic coating compositions" or "catalytic coatings."

The terms "catalyst composition" and "catalytic coating composition" are synonymous. A catalyst and/or sorbent composition as described herein may comprise one or more supports or "carriers" such as refractory inorganic solid oxide porous powders further comprising functionally active species.

Catalyst and/or sorbent compositions may be prepared using a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., preferably, about 800° C. and higher water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehmite or gamma-alumina. In specific embodiments, the binder is typically used in an amount of about 1-10 wt. % of the total washcoat loading.

In one or more embodiments, the binder can be zirconia-based or silica-based, such as zirconium acetate, zirconia sol or silica sol. In specific embodiments, the alumina binder is typically used in an amount of about 0.05 g/in$^3$ to about 0.5 g/in$^3$.

Substrates

In one or more embodiments, the present catalyst compositions are disposed on a substrate to form a catalytic article. Catalytic articles comprising the substrates are part of an exhaust gas treatment system (e.g., catalyst articles including, but not limited to, articles including the AEI SCR compositions disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Flow-Through Substrates

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flowthrough substrate").

In one or more embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described below.

Flow-through substrates can, for example, have a volume of from about 50 in3 to about 1200 in$^3$, a cell density (inlet openings) of from about 60 cells per square inch (cpsi) to about 1200 cpsi or about 200 to about 900 cpsi, or for example from about 300 to about 600 cpsi and a wall thickness of from about 50 to about 400 microns or about 100 to about 200 microns.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punch-outs" in the channel walls. The metallic substrates may be employed in various shapes such as pellets, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % (weight percent) of the alloy, for instance, about 10 to about 25 wt. % chromium, about 1 to about 8 wt. % of aluminum, and from 0 to about 20 wt. % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Wall-Flow Substrate

Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wallflow filter"). Flow-through and wall-flow substrates are also taught, for example, in International Application Publication No. WO 2016/070090, which is incorporated herein by reference in its entirety.

In one or more embodiments, the catalyst substrate comprises a honeycomb substrate in the form of a wall-flow filter or a flow-through substrate. In preferably specific embodiments, the substrate is a wall-flow filter.

In one or more embodiments, a catalytic article can be provided by applying a catalytic coating (e.g., as disclosed here) to the substrate as a washcoat.

Coatings

In one or more embodiments, a substrate is coated with a catalytic composition to form a catalytic article. The catalytic coating may comprise one or more thin, adherent coating layers disposed on and in adherence to at least a portion of a substrate.

In one or more embodiments, the present catalytic articles may include the use of one or more catalyst layers and combinations of one or more catalyst layers. The catalytic coating may be on the substrate wall surfaces and/or in the pores of the substrate walls, that is "in" and/or "on" the substrate walls. Thus, the phrase "a catalytic coating disposed on the substrate" means on any surface, for example on a wall surface and/or on a pore surface. In specific embodiments, catalytic coating layer(s) may comprise the individual functional components, that is, an AEI SCR catalyst composition, as described herein.

In one or more embodiments, a catalyst composition may typically be applied in the form of a washcoat, containing support material having catalytically active species thereon. In the other specific embodiments, a catalytic composition may typically be applied in the form of a washcoat containing catalytic active species.

In one or more embodiments, a washcoat is formed by preparing a slurry containing a specified solids content (e.g., about 10 to about 60% by weight) of supports in a liquid vehicle, which is then applied to a substrate and dried and calcined to provide a coating layer. If multiple coating layers are applied, the substrate is dried and calcined after each layer is applied and/or after the number of desired multiple layers are applied. In one or more specific embodiments, the catalytic material(s) are applied to the substrate as a washcoat. Binders may also be employed as described above.

In one or more embodiments, the above-noted catalyst composition(s) are generally independently mixed with water to form a slurry for purposes of coating a catalyst substrate, such as a honeycomb-type substrate. In addition to the catalyst particles, the slurry may optionally contain a binder (e.g., alumina, silica), water-soluble or waterdispersible stabilizers, promoters, associative thickeners, and/or surfactants (including anionic, cationic, non-ionic or amphoteric surfactants).

In one or more embodiments, a typical pH range for the slurry is 5 or about 3 to about 6. Addition of acidic or basic species to the slurry can be carried out to adjust the pH accordingly. In preferably specific embodiments, the pH of the slurry is adjusted by the addition of acetic acid.

In one or more embodiments, the slurry can be milled to enhance mixing of the particles and formation of a homogenous material. The milling can be accomplished in a ball mill, continuous mill, or other similar equipment, and the solids content of the slurry may be, e.g., about 10-60 wt. %, more particularly about 20-50 wt. %. In preferably specific embodiments, the post-milling slurry is characterized by a $D_{90}$ particle size of about 0.5 to about 50 microns, preferably from about 2 to about 30 microns, more preferably from about 2 to about 20 microns.

In one or more embodiments, the slurry is then coated on the catalyst substrate using any washcoat technique known in the art. In preferably specific embodiments, the catalyst substrate is dipped one or more times in the slurry or otherwise coated with the slurry. Thereafter, the coated substrate is dried at an elevated temperature (e.g., 100-150° C.) for a period of time (e.g., 10 seconds-3 hours) and then calcined by heating, e.g., at 400-600° C., typically for about 5 minutes to about 3 hours. Following drying and calcining, the final washcoat coating layer can be viewed as essentially solvent-free.

In one or more embodiments, after calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In one or more embodiments, the washcoat(s) can be applied such that different coating layers may be in direct contact with the substrate. Alternatively, one or more "undercoats" may be present, so that at least a portion of a catalytic layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different coating layers may be in direct contact with each other without a "middle" overlapping zone. Alternatively, different coating layers may not be in direct contact, with a "gap" between the two zones. In the case of an "undercoat" or "overcoat" the gap between the different layers is termed an "interlayer." An undercoat is a layer "under" a coating layer, an overcoat is a layer "over" a coating layer and an interlayer is a layer "between" two coating layers. The interlayer(s), undercoat(s) and overcoat(s) may contain one or more functional compositions or may be free of functional compositions.

In one or more embodiments, the catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending from about 10% to about 100%, for example about 10%, about 20%, about 30%, about 40%, about 50%, about 60%, about 70%, about 80%, or about 90% or about 100% of the substrate length. Another layer may extend from the outlet end towards the inlet end extending from about 10% to about 100%, for example about 10%, about 20%, about 30%, about 40%, about 50%, about 60%, about 70%, about 80%, or about 90% or about 100% of the substrate length.

In specific embodiments, different coating layers may be adjacent to each other and not overlay each other.

In the other specific embodiments, different layers may overlay a portion of each other, providing a third "middle" zone. The middle zone may extend from about 10% to about 100% of the substrate length, for example about 10%, about 20%, about 30%, about 40%, about 50%, about 60% or about 70% or 80% or 90% of the substrate length.

In still other specific embodiments, different layers may each extend the entire length of the substrate or may each extend a portion of the length of the substrate and may overlay or underlay each other, either partially or entirely. Each of the different layers may extend from either the inlet or outlet end. Different catalytic compositions may reside in each separate coating layer.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

Exhaust Gas Treatment Systems

The present disclosure further provides an exhaust gas treatment system for reducing a NOx level in an exhaust gas stream from an internal combustion engine, the exhaust gas treatment system comprising a catalytic article as disclosed herein.

In another aspect of the present invention is provided a method for reducing a NOx level in an exhaust gas stream from an internal combustion engine, the method comprising contacting the exhaust gas stream with a catalytic article as disclosed herein, or an emission treatment system as disclosed herein. The present invention therefore provides an exhaust gas treatment system that incorporates the catalytic articles described herein, such as an exhaust gas treatment system generally comprising an engine producing an exhaust gas stream and one or more catalytic articles positioned downstream from the engine in fluid communication with the exhaust gas stream.

In one or more embodiments, the engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations).

In one or more embodiments, the exhaust gas treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

In one or more embodiments, the exhaust gas treatment systems disclosed herein comprise a AEI SCR catalyst article, which can comprise a flowthrough or wall-flow filter substrate, as disclosed herein. In particular, systems comprise a AEI SCR catalyst article suitable for converting NOx under the presence of a reducing agent, e.g. ammonia at lower temperatures. The NOx conversion component of the present catalyst compositions provides desirable NOx conversion properties under various engine operating conditions in particular at lower temperature engine exhaust operations.

In one or more embodiments, the exhaust gas treatment systems of the present disclosure can contain, in addition to the AEI SCR catalyst article, for example, a DOC, a reductant injector, a second SCR catalyst component, a soot filter (which can be catalyzed or uncatalyzed), and/or an ammonia oxidation catalyst (AMOx). A suitable DOC for use in the emission treatment system is able to effectively catalyze the oxidation of CO and HC to carbon dioxide ($CO_2$). Preferably, the DOC is capable of converting at least 50% to about 99% of the CO or HC component present in the exhaust gas. The DOC may be located, for example, upstream of the AEI SCR catalyst article. In some embodiments, the DOC is located upstream of the AEI SCR catalyst article component and/or soot filter. In other embodiments the AEI SCR catalyst component may be located upstream of the DOC and/or soot filter. As such the AEI SCR catalyst article is located upstream of an Ammonia oxidation catalyst to importantly have the exhaust treatment system not release $NH_3$ species to the tail pipe.

In one or more embodiments, the exhaust gas treatment system of the present disclosure may further comprise a second SCR catalyst component located downstream to the AEI SCR catalyst article. A suitable SCR catalyst component for use in the emission treatment system downstream to the AEI SCR catalyst article is able to effectively catalyze the reduction of the NOx exhaust component at elevated temperatures as high as 650° C. Preferably, the second SCR catalyst component is capable of converting at least 50% to about 99% of the NOx (e.g., NO) component to $N_2$ at temperatures>250 C, depending on the amount of reductant added to the system. The reductant can be added by a second reductant injector placed upstream to the second SCR component. Useful SCR catalyst components used in the emission treatment system should also have thermal resistance to temperatures greater than 650° C. Such high temperatures may be encountered during regeneration of the catalyzed soot filter.

Figure 2:
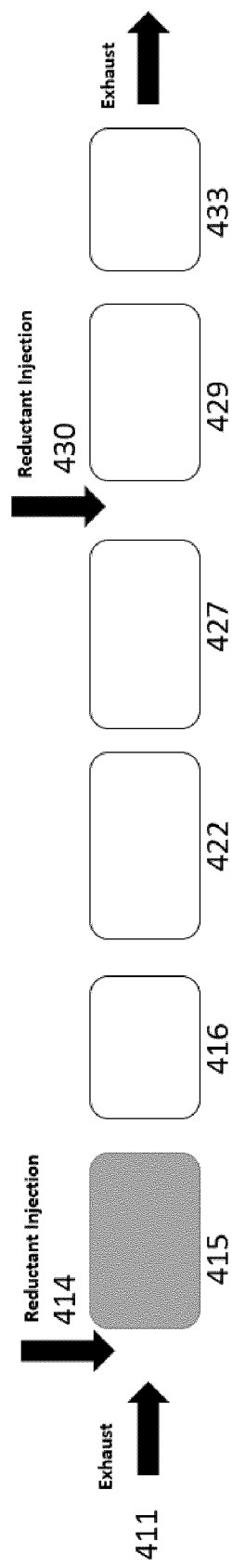
FIG. 2 is a schematic view showing alternative exhaust treatment systems according to one or more embodiments.

Exemplified exhaust gas treatment systems may be more readily appreciated by reference to FIGS. 1 and 2, which depict schematic representations of exhaust gas treatment systems in accordance with embodiments of the present invention.

Referring to FIG. 1, exhaust gas treatment system is provided, in one or more embodiments, an exhaust gas stream containing gaseous pollutants (e.g., unburned hydrocarbons, carbon monoxide and particulate matter) and NO is conveyed from an engine 321 to a DOC 322. In the DOC 322, unburned gaseous and non-volatile hydrocarbons and carbon monoxide are largely combusted to form carbon dioxide and water. NO is partially oxidized to $NO_2$. The exhaust stream is next conveyed to a CSF 327, which traps particulate matter present within the exhaust gas stream. After removal of particulate matter, via the CSF 327, the exhaust gas stream is conveyed to the AEI SCR catalyst component 329, which provides treatment and/or conversion of NOx. Reductant (Urea or Ammonia) is fed by a reductant injector 330 to the inlet of the AEI SCR catalyst component 329. The exhaust gas passes through the AEI SCR catalyst component 329 at a flow rate which allows sufficient time for the catalyst composition to reduce the level of NOx (in combination with a reductant) in the exhaust gas at a given temperature in the exhaust gas. The AEI SCR component 329 is followed by a selective ammonia oxidation catalyst component 333 (AMOx) to remove excess NH$_3$ released from the AEI SCR catalyst component 329 and selectively oxidize it to N$_2$.

In alternative embodiments, the CSF 327 can be moved to the place between the AEI SCR catalyst component 329 and the selective ammonia oxidation catalyst component 333 (AMOx).

In alternative embodiments, a second downstream SCR catalyst 334 can be placed between the AEI SCR 329 and the AMOx catalyst 333, and an optional reductant is fed by a second reductant injector 335 to the inlet of the second downstream SCR 334.

In alternative embodiments, an second upstream SCR catalyst 334 can be placed between the DOC 322 and the AEI SCR 329, the second upstream SCR catalyst 334 can be placed upstream or downstream of the CSF 327, and an optional reductant is fed by a second reductant injector 335 to the inlet of the second upstream SCR 334.

Referring to FIG. 2, another exhaust gas treatment system is provided, in one or more embodiments, an exhaust gas stream containing gaseous pollutants (e.g., unburned hydrocarbons, carbon monoxide particulate matter) and NO is conveyed from an engine 411 to the AEI SCR catalyst component 415 in close couple position, which provides treatment and/or conversion of NO. Reductant (Urea or Ammonia) is fed by a reductant injector 414 to the inlet of the AEI SCR catalyst component 415. The exhaust gas passes through the SCR catalyst component 415 at a flow rate which allows sufficient time for the catalyst composition to reduce the level of NOx (in combination with a reductant) in the exhaust gas at a given temperature in the exhaust gas. The AEI SCR component 415 is followed by a selective ammonia oxidation catalyst component 416 (AMOx) to remove excess NH$_3$ released from the AEI SCR catalyst component 415 and selectively oxidize it to N$_2$.

The exhaust is then transferred to DOC 422. In the DOC 422, unburned gaseous and non-volatile hydrocarbons and carbon monoxide are largely combusted to form carbon dioxide and water. The exhaust stream is next conveyed to a CSF 427, which traps particulate matter present within the exhaust gas stream. After removal of particulate matter, via CSF 427, the exhaust gas stream is conveyed to the second SCR catalyst component 429 in underfloor position, which provides treatment and/or conversion of NO. Reductant (Urea or Ammonia) is fed by a second reductant injector 430 to the inlet of a SCR catalyst component 429. The exhaust gas passes through the SCR catalyst component 429 at a flow rate which allows sufficient time for the catalyst composition to reduce the level of NOx (in combination with a reductant) in the exhaust gas at a given temperature in the exhaust gas. The downstream SCR catalyst component 429 is followed by a selective ammonia oxidation catalyst component 433 (AMOx) to remove excess NH$_3$ released from the SCR catalyst component 429 and selectively oxidize it to N$_2$.

In alternative embodiments, the CSF 427 can be moved to the place between the SCR catalyst component 429 and the selective ammonia oxidation catalyst component 433 (AMOx).

In alternative embodiments, the selective ammonia oxidation catalyst component 416 (AMOx) can be removed: In this scenario, reductant (Urea or Ammonia) is fed with a well-controlled amount by the reductant injector 414 to minimize ammonia (NH$_3$) slip out of the AEI SCR catalyst component 415, and the DOC 422 oxidizes NH$_3$ released from the AEI SCR catalyst component 415.

In alternative embodiments, the DOC 422 can be moved to the place upstream of the AEI SCR catalyst component 415.

In one or more embodiments, the components as exemplified in FIGS. 1 and 2 can be integrated as one catalyst or in one "brick" via different layouts (zoning, layering, homogeneous, etc.).

In some embodiments in FIG. 1, the DOC 322 and the CSF 327 can be integrated as one catalyst, via e.g. two-layer or multi-layer washcoat designs, front zone plus rear zone washcoat designs, homogeneous washcoat designs, or combinations thereof. In some embodiments in FIG. 2, the DOC 422 and the CSF 427 can be integrated in a similar approach.

In some embodiments in FIG. 1, the CSF 327 and the AEI SCR 329 can be integrated as one catalyst, via e.g. two-layer or multi-layer washcoat designs, front zone plus rear zone washcoat designs, homogeneous washcoat designs, or combinations thereof. In some embodiments in FIG. 2, the CSF 427 and the SCR 429 can be integrated in a similar approach.

In some embodiments in FIG. 1, the AEI SCR 329 and the AMOx 333 can be integrated as one catalyst, via e.g. two-layer or multi-layer washcoat designs, front zone plus rear zone washcoat designs, homogeneous washcoat designs, or combinations thereof. In some embodiments in FIG. 2, the AEI SCR 415 and the AMOx 416 can be integrated in a similar approach. In some embodiments in FIG. 2, the SCR 429 and the AMOx 433 can be integrated in a similar approach.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

Reference throughout this disclosure to "one embodiment", "some embodiments", "certain embodiments", "one or more embodiments," "alternative embodiments" or "an embodiment" means that a particular feature, structure, material, or characteristic described in connection with the embodiment is included in at least one embodiment of the invention. Thus, the appearances of the phrases such as "one embodiment", "some embodiments", "certain embodiments", "one or more embodiments," "alternative embodiments" or "an embodiment" in various places throughout this disclosure are not necessarily referring to the same embodiment of the invention. Furthermore, the particular features, structures, materials, or characteristics may be combined in any suitable manner in one or more embodiments.

EXAMPLES

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

Catalyst Article Preparation

Example 1

23.0 g sucrose and 23.5 g (97.66 wt %) CuO were mixed and dispersed into 494.8 g water under stirring to prepare a slurry. After 30 minutes of stirring 82.70 g aqueous Zr~OAc (30 wt %) was added followed by another 10 mins of stirring. Then 479.2 g H-form AEI Zeolite (solid content 94.37 wt %) with SAR 16 (Clean A-01) was fed slowly, keeping the temperature of the slurry below 30° C. Depending on the slurry rheology properties de-foaming agents, viscosity modifiers and/or thickener(s) respectively can be added. After 30 mins stirring, the slurry was subdued to a milling process to achieve a $D_{90}$ of 5.6 microns. The slurry was kept idle overnight followed by coating onto a cordierite substrate (1"×4", NGK 400/4) by submerging it into the slurry. The such obtained catalyst was quick-dried at 150° C. and then calcined at 550° C. for 1 h. Final wash coat composition was 4.59 wt % CuO; 4.96 wt % $ZrO_2$; 90.45 wt % AEI with a total washcoat loading of 2.1 $g/in^3$.

Figure 3:
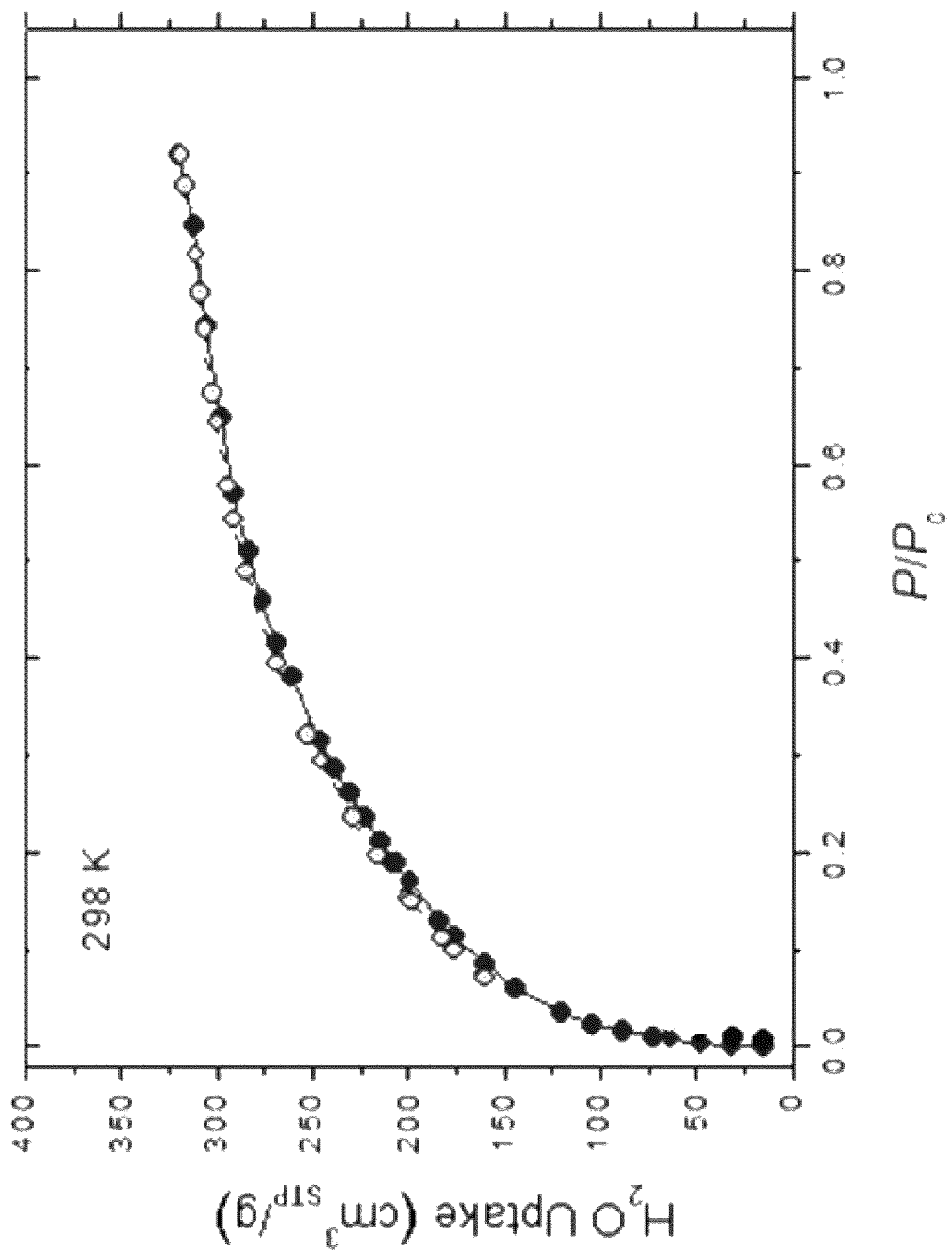
FIG. 3 is a graph showing the water uptake of the AEI Zeolite with SAR 16.

The water uptake of the AEI Zeolite with SAR 16 is provided in FIG. 3.

Comparative Example 2

23 g sucrose and 23.5 g (97.66 wt %) CuO were mixed and dispersed into 512.7 g water under stirring to prepare a slurry. After 30 minutes of stirring 82.70 g aqueous Zr~OAc (30 wt %) was added followed by another 10 mins of stirring. Then 461.3 g H-form AEI Zeolite (solid content 98.03 wt %) with SAR 21 (Clean A-01) was fed slowly, keeping the temperature of the slurry below 30° C. Depending on the slurry rheology properties de-foaming agents, viscosity modifiers and/or thickener(s) respectively can be added. After 30 mins stirring, the slurry was subdued to a milling process to achieve a $D_{90}$ of 10.7 microns. The slurry was kept idle overnight followed by coating onto a cordierite substrate (1"×4", NGK 400/4) by submerging it into the slurry. The such obtained catalyst was quick-dried at 150° C. and then calcined at 550° C. for 1 h. Final wash coat composition was 4.59 wt % CuO; 4.96 wt % $ZrO_2$; 90.45 wt % AEI with a total washcoat loading of 2.1 $g/in^3$.

Comparative Example 3

17.3 g sucrose and 17.8 g (97.66 wt %) CuO were mixed and dispersed into 513.5 g water under stirring to prepare a slurry. After 30 minutes of stirring 82.70 g aqueous Zr~OAc (30 wt %) was added followed by another 10 mins of stirring. Then 471.8 g H-form AEI Zeolite (solid content 97.04 wt %) with SAR 21 (Clean A-01) was fed slowly, keeping the temperature of the slurry below 30° C. Depending on the slurry rheology properties de-foaming agents, viscosity modifiers and/or thickener(s) respectively can be added. After 30 mins stirring, the slurry was subdued to a milling process to achieve a $D_{90}$ of 9.7 microns. The slurry was kept idle overnight followed by coating onto a cordierite substrate (1"×4", NGK 400/4) by submerging it into the slurry. The such obtained catalyst was quick-dried at 150° C. and then calcined at 550° C. for 1 h. Final wash coat composition was 3.47 wt % CuO; 4.96 wt % $ZrO_2$; 91.57 wt % AEI with a total washcoat loading of 2.1 $g/in^3$.

The Properties of AEI Zeolite used in Examples 1-3 is listed in Table 1.

TABLE 1

| AEI Zeolite | $D_{10}$ (microns) | $D_{50}$ (microns) | $D_{90}$ (microns) | Tap density (g/cm$^3$) | Total surface area (m$^2$/g) | Zeolitic surface area (m$^2$/g) | Matrix surface area (m$^2$/g) |
|---|---|---|---|---|---|---|---|
| SAR 16 | 1.34 | 3.24 | 7.29 | 0.33 | 569 | 559 | 10 |
| SAR 21 | 1.62 | 5.92 | 12.92 | 0.38 | 583 | 569 | 14 |

Figure 4:
FIG. 4 is a graph showing the SEM image of the AEI Zeolite with SAR 16.
Figure 5:
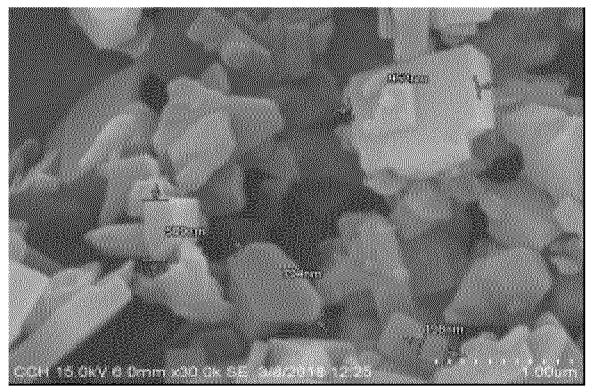
FIG. 5 is a graph showing the SEM image of the AEI Zeolite with SAR 21.

The SEM images of AEI Zeolite used in Examples 1-3 are shown in FIGS. 4 and 5. The SEM images of the primary crystals of the zeolite powder were collected on a Hitachi SU-1510 electron microscope after pretreating the powder sample by spraying with gold.

Catalyst System Evaluation

Example 4

The monolithic catalytic articles from Examples 1, 2 and 3 were tested on a laboratory reactor with four different catalysts in series (DOC+CSF+SCR+AMOx) to simulate the exhaust configuration in FIG. 1 with the simulated exhaust in 321, the DOC in position of 322, the CSF in position of 327, the ammonia injector in position of 330, the AEI SCR catalyst article from example 1 or the AEI SCR catalyst article from comparative example 2 or the AEI SCR catalyst article from comparative example 3 in position 329 and the AMOx in position 333. The exhaust composition is monitored prior to the DOC at position 322 and after the AMOx in position 333 The injection of Ammonia is separately monitored after the ammonia injector at position 330 and before the AEI SCR catalyst article from example 1 or the AEI SCR catalyst article from comparative example 2 or the AEI SCR catalyst article from comparative example 3 in position 329.

More specifically a core drilled from a commercial DOC with 40 g/ft$^3$ (Pt:Pd=1:1) and dimensions of 1"×2" was placed in the first position 322. A core drilled from a commercial CSF with 3 g/ft$^3$ (Pt:Pd=10:1) and dimensions of 1"×4" was placed at position 327 after the DOC at position 322. The AEI SCR catalyst article from Examples 1-3 with dimensions of 1"×4" was placed at position 329 after the CSF at position 327. Ammonia was injected at position 330 in-between CSF at position 327 and SCR catalyst at position 329. A core drilled from a commercial AMOx with 3 g/ft$^3$ (Pt Only) and Cu-CHA at dimensions 1"×1" was placed in position 333 after the Example SCR articles at position 329.

Three different configurations were evaluated for exhaust system testing following the beforehand mentioned set up: (A) DOC+CSF+AEI SCR article from Experiment 1+AMOx, (B) DOC+CSF+AEI SCR article from comparative Example 2+AMOx, and (C) DOC+CSF+AEI SCR article from comparative Example 3+AMOx. The positions of DOC, CSF, SCR and AMOx are the same as described in the above paragraph: DOC placed in the position 322, CSF placed in the position 327, SCR placed in the position 329, and AMOx placed in the position 333.

The AEI SCR catalyst article of the inventive system (A) from example 1 has the same final wash coat composition of 4.59 wt % CuO with the second exhaust system (B) with the AEI SCR catalyst article from comparative example 2. The AEI SCR catalyst article of the inventive system (A) from example 1 has the same copper to alumina molar ratio of 0.33 with the third exhaust system (C) with AEI SCR catalyst article from comparative example 3. The AEI SCR catalyst article from comparative example 3 has a final wash coat composition of 3.47 wt % CuO. The AEI SCR catalyst article from comparative example 2 has a copper to alumina molar ratio of 0.44. All SCR catalyst articles have a total washcoat loading of 2.1 g/in$^3$.

A diesel engine has a wide operating temperature range. In well-designed urea-SCR systems, urea injection may be possible at temperatures as low as about 180° C. to about 200° C., when a diesel engine experiences cold or hot start, or driving conditions such as low speed or low load. 180° C. is, for this reason, chosen as the low temperature point for SCR performance evaluation.

Active regeneration processes are normally initiated by altering the engine management to raise temperatures in front of the filter up to about 550° C. to about 650° C. The high exotherms burn out soot and regenerate the filter.~580° C. is, for this reason, chosen as the high temperature point for SCR performance evaluation.

Figure 6:
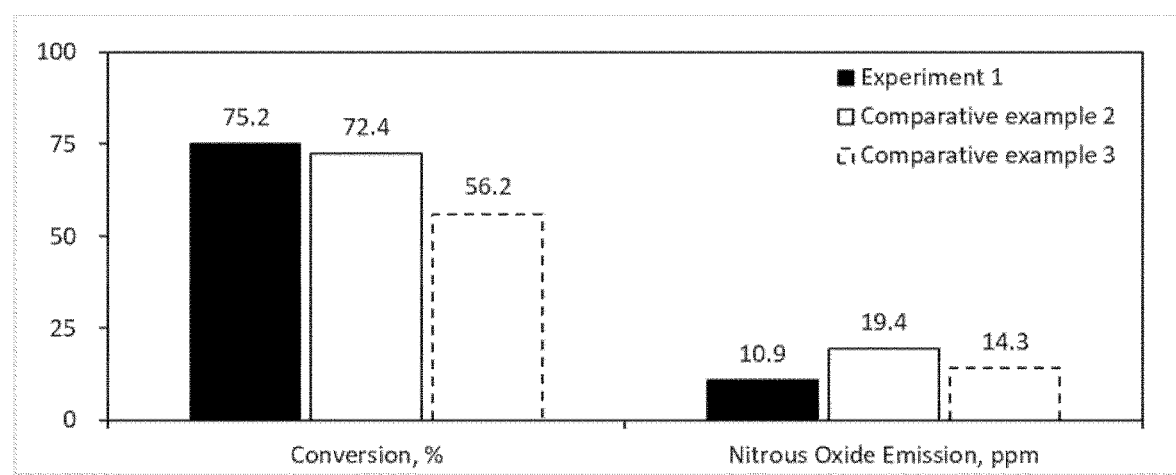
FIG. 6 is a graph showing the comparative results for NOx conversion and $N_2O$ formation for the exhaust treatment system with the AEI SCR catalyst article from Example 1 versus the exhaust treatment systems for the AEI SCR catalyst articles from comparative Example 2 and 3.

Low temperature SCR performance for at 180° C. (177-181° C.) was measured with flowing gas condition: 500 ppm NO; 500 ppm NH$_3$; 5% H$_2$O; 10% O$_2$; N$_2$ as balance and Space velocity for the SCR of 80000 h$^{-1}$, that is 68 L min$^{-1}$ flow. Concentration of NO, NO$_2$, N$_2$O and NH$_3$ were quantitatively measurex with an FTIR analyzer. Comparative results for NOx conversion and N$_2$O formation are shown in FIG. 6. As illustrated in FIG. 6 the inventive system (A) with the AEI SCR catalyst article from example 1 displayed the highest NOx conversion compared to both other systems with system (B) with the AEI SCR catalyst article from comparative example 2 with the same CuO loading and with system (C) with the AEI SCR catalyst article from comparative example 3 with the same copper to alumina molar ratio. In particular the exhaust system (C) with the AEI SCR catalyst article from comparative example 3 displayed a very unfavorable low temperature NOx conversion and was therefore was not considered for testing at high temperatures. The exhaust system (B) from comparative example 2 showed only a slightly inferior NOx performance at low temperatures but a way higher generation of undesired N$_2$O.

High temperature NOx conversion for the DOC+CSF+SCR+AMOx systems were measured at an SCR inlet temperature of 584° C.+/−1° C. in a flowing gas condition of 500 ppm NO; 500 ppm NH$_3$; 5% H$_2$O; 10% O$_2$; N$_2$ as balance and Space velocity for SCR of 80000 h-1, 68 L min-1 flow. Concentration of NO, NO$_2$, N$_2$O and NH$_3$ were quantitatively measured with an FTIR analyzer. Comparative results for NOx conversion and N$_2$O formation are shown in FIG. 7.

Figure 7:
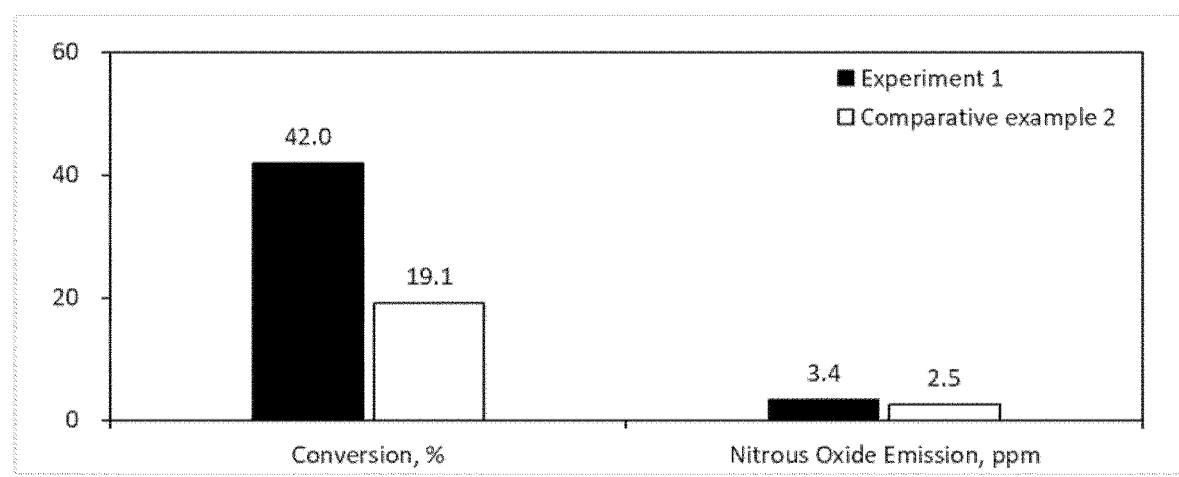
FIG. 7 is a graph showing the comparative results for NOx conversion and $N_2O$ formation for the exhaust treatment system with the AEI SCR catalyst article from Example 1 versus the exhaust treatment system for the AEI SCR catalyst article from comparative Example 2.

As illustrated in FIG. 7 the inventive system (A) with the AEI SCR catalyst article from example 1 displayed a much higher NOx conversion compared to the exhaust system (B) with the AEI SCR catalyst article from comparative examples 2 with the same CuO loading.

In a conclusion comparing all three AEI based exhaust systems with different SAR but to the AEI SCR catalyst article from example 1 for the AEI SCR catalyst article from system (B) same absolute Cu loading and for the AEI SCR catalyst article from system (C) same copper to alumina molar ratio, the inventive exhaust system (A) with the AEI SCR catalyst article from example 1 displayed a desirable superior NOx performance at both low and high temperatures and at the same time a favorable N$_2$O make at low temperatures.

The invention claimed is:

1. An exhaust treatment system for a lean burn engine, the exhaust treatment system comprising a Diesel Oxidation Catalyst (DOC), a Catalyzed Soot Filter (CSF), a first reductant injector, an AEI zeolite based Selective Catalyzed Reduction (SCR) catalyst, and a first Ammonia Oxidation Catalyst (AMOx) downstream to the AEI zeolite based SCR catalyst;
wherein the AEI zeolite has a silica to alumina molar ratio of 14-18.

2. The exhaust treatment system according to claim 1, further comprising a second SCR placed between the AEI zeolite based SCR catalyst and the first AMOx catalyst; and an optionally a second reductant injector placed between the AEI zeolite based SCR catalyst and the second SCR catalyst.

3. The exhaust treatment system according to claim 2, wherein the second SCR catalyst comprises a zeolite material chosen from AEI zeolite, CHA zeolite, and BEA zeolite.

4. The exhaust treatment system according to claim 2, wherein the AEI zeolite based SCR catalyst and second SCR catalyst comprise a metal promoted zeolite, chosen from iron and copper.

5. The exhaust treatment system according to claim 4, wherein the AEI zeolite based SCR catalyst ranges from 2.0 percent to 10.0 percent by weight of the metal, calculated as oxides of the metal and based on the total weight of the oxides plus the AEI zeolite based SCR catalyst.

6. The exhaust treatment system according to claim 4, wherein the second SCR catalyst ranges from 2.0 to 8.0 percent by weight of the metal, calculated as oxides of the metal and based on the total weight of the oxides plus the second SCR catalyst.

7. The exhaust treatment system according to claim 2, wherein the CSF is coated with the second SCR catalyst; and wherein the first reductant injection is placed in front of the filter.

8. The exhaust treatment exhaust treatment system according to claim 2, wherein the AEI zeolite SCR and the second SCR are coated on a ceramic or metallic monolith with a catalyst loading ranging from 50 g/l to 250 g/l.

9. The exhaust treatment system according to claim 1, further comprising a second SCR catalyst and an optionally second AMOx catalyst, wherein the AEI zeolite based SCR catalyst and the second AMOx catalyst are placed upstream of the DOC and CSF; and the second SCR catalyst and the first AMOx catalyst are placed downstream of the DOC catalyst.

10. The exhaust treatment system according to claim 9, further comprising a second reductant injector in front of the second SCR catalyst, wherein the first reductant injector is placed in front of the AEI zeolite based SCR catalyst.

11. The exhaust treatment system according to claim 9, wherein the first AMOx catalyst and the second AMOx catalyst comprise at least a platinum group metal component and at least a high surface area support material.

12. The exhaust treatment system according to claim 11, wherein the first AMOx catalyst and the second AMOx catalyst independently comprise the platinum group metal ranging from 0.5 g/ft$^3$ to 10 g/ft$^3$, calculated as the total weight of PGM element over the volume of the AMOx catalyst, or ranging from 0.01 wt. % to 2 wt. %, based on the weight of the dry AMOx catalyst.

13. The exhaust treatment system according to claim 11, wherein the first AMOx catalyst and the second AMOx catalyst independently comprise a high surface area metal oxide with a particle size distribution $D_{50}$ ranging from 1 microns to 10 microns, or a particle size distribution $D_{90}$ ranging from 2 microns to 30 microns.

14. The exhaust treatment system according to claim 9, wherein the first AMOx catalyst and the second AMOx catalyst comprise a high surface area metal oxide having a surface area ranging from 50 m$^2$/g to 400 m$^2$/g, based on BET characterization, or mean pore volume ranging from 0.3 cm$^3$/g to 1.5 cm$^3$/g, or mean pore radius ranging from 2 nm to 50 nm.

15. The exhaust treatment system according to claim 1, wherein the first AMOx catalyst and the second AMOx catalyst independently comprise a catalyst coating with a bottom layer of a Pt supported on a high surface area metal oxide; and further comprise a second catalyst coating with a layer of Cu-CHA or Cu-AEI.

16. The exhaust treatment system according to-claim 1, wherein the DOC catalyst comprises at least a platinum group metal component and at least a high surface area support material.

17. The exhaust treatment system according to claim 16, wherein the DOC catalyst comprises the at least one platinum group metal component ranging from 5 g/ft$^3$ to 250 g/ft$^3$ based on the volume of the DOC catalyst, or from 0.5 wt. % to 10 wt. % based on the weight of the dry DOC catalyst.

18. The exhaust treatment system according to claim 16, wherein the DOC catalyst comprises platinum (Pt) without palladium (Pd), comprises palladium (Pd) without platinum (Pt), or comprises platinum (Pt) and palladium (Pd) in a Pt:Pd weight ratio from 1:10 to 10:1.

19. The exhaust treatment system according to claim 1, wherein the DOC catalyst comprises a high surface area metal oxide with a particle size distribution $D_{50}$ ranging from 1 microns to 10 microns, or a particle size distribution $D_{90}$ ranging from 4 microns to 30 microns.

20. The exhaust treatment system according to claim 1, wherein the DOC catalyst comprises a high surface area metal oxide, having a surface area ranging from 50 m$^2$/g to 400 m$^2$/g, based on BET characterization, a mean pore volume ranging from 0.3 cm$^3$/g to 1.5 cm$^3$/g, or a mean pore radius ranging from 2 nm to 50 nm.

21. The exhaust treatment system according to claim 1, wherein the CSF comprises a catalyst that permeates the walls of a wall flow monolith, that forms a coating on the surface walls of a wall flow monolith, or comprises a combination of in-wall and on-wall catalyst coating.

22. The exhaust treatment system according to claim 21, wherein the CSF comprises at least a promoter metal chosen from a platinum group metal component, copper, iron, vanadium, and molybdenum.

23. The exhaust treatment system according to claim 21, wherein the CSF comprises a porous filter wall having a mean pore diameter; and a catalyst coating having a mean particle size; wherein the ratio of the filter mean pore diameter to the catalyst mean particle size distribution $D_{50}$ ranges from 0.5 to 50, and the ratio of the filter mean pore diameter to the catalyst mean particle size distribution $D_{90}$ ranges from 0.25 to 30.

24. The exhaust treatment exhaust according to claim 1, wherein the AEI zeolite has a crystal size ranging from 0.1 microns to 2.5 microns, an agglomerate size with a mean $d_{10}$ ranging from 0.5 microns to 2.5 microns and a mean $d_{90}$ ranging from 5 microns to 30 microns.

25. The exhaust treatment exhaust treatment system according to claim 1, wherein the AEI zeolite has a zeolite surface area of at least 450 m$^2$/g; and a matrix surface area of maximum 50 m$^2$/g.

26. The exhaust treatment exhaust treatment system according to claim 1, wherein the AEI zeolite has a tapped density after 100 strikes ranging from 0.10 g/ml to 0.90 g/ml.

27. The exhaust treatment exhaust treatment system according to claim 1, wherein the AEI zeolite has a water uptake of at least 250 cm$^3$/g at 295 K after degassing for 5 h at 300° C. at a relative water pressure $P/P_0$ of 0.5.

28. A method for treating exhaust gas from a lean burn engine comprising:
(i) providing an exhaust treatment system according to claim 1, and
(ii) conducting the exhaust gas from the lean burn engine through the exhaust treatment system.

29. The method according to claim 28, wherein the exhaust gas comprises hydrocarbons, carbon monoxide, nitrogen oxides, and particulates.

* * * * *